(12) United States Patent
Kobayashi et al.

(10) Patent No.: US 6,414,059 B1
(45) Date of Patent: Jul. 2, 2002

(54) FIRE-RETARDANT RESIN COMPOSITION AND MOLDED PART USING THE SAME

(75) Inventors: Kazuhiko Kobayashi, Yokohama; Ken Okubo, Kawasaki; Shinnichi Kishimoto; Masaki Nishiguchi, both of Tokyo; Hitoshi Yamada; Dai Hashimoto, both of Ichihara, all of (JP)

(73) Assignee: Riken Technos Corporation, Tokyo (JP)

( * ) Notice: Subject to any disclaimer, the term of this patent is extended or adjusted under 35 U.S.C. 154(b) by 0 days.

(21) Appl. No.: 09/384,557

(22) Filed: Aug. 27, 1999

(51) Int. Cl.$^7$ .............................. C08K 5/34; C08K 3/10
(52) U.S. Cl. ..................... 524/101; 523/212; 524/405; 524/436; 524/437
(58) Field of Search ................................ 524/436, 437, 524/264, 265, 269, 101, 405; 523/204, 212

(56) References Cited

U.S. PATENT DOCUMENTS

| | | | | | |
|---|---|---|---|---|---|
| 3,922,442 A | * | 11/1975 | North et al. | ................. | 524/437 |
| 3,926,873 A | * | 12/1975 | Aishima et al. | ............ | 524/436 |
| 4,698,379 A | * | 10/1987 | Nakaya et al. | ............ | 524/436 |
| 4,727,102 A | * | 2/1988 | Scarso | ........................ | 524/100 |
| 5,191,004 A | * | 3/1993 | Maringer et al. | ........... | 524/436 |
| 5,236,985 A | * | 8/1993 | Hayami | ...................... | 524/436 |
| 5,482,990 A | * | 1/1996 | Jow et al. | .................... | 524/437 |
| 5,827,906 A | * | 10/1998 | Metzemacher et al. | ..... | 524/430 |
| 5,889,087 A | * | 3/1999 | Hayashi et al. | ............. | 524/436 |
| 5,936,037 A | * | 8/1999 | Tasaka | ......................... | 524/504 |
| 6,008,295 A | * | 12/1999 | Takeichi et al. | ............ | 524/437 |
| 6,034,162 A | * | 3/2000 | Mizutani et al. | ........... | 524/436 |
| 6,096,816 A | * | 8/2000 | Kuckro | ........................ | 524/437 |

FOREIGN PATENT DOCUMENTS

| | | |
|---|---|---|
| JP | 8225713 A | 9/1996 |
| JP | 9151295 A | 6/1997 |
| JP | 10324782 A | 12/1998 |
| JP | 11256004 A | 9/1999 |

\* cited by examiner

*Primary Examiner*—Veronica P. Hoke
(74) *Attorney, Agent, or Firm*—Birch, Stewart, Kolasch & Birch, LLP

(57) ABSTRACT

A fire-retardant resin composition, comprising: a thermoplastic resin component (A) of (a) a (hydrogenated) block copolymer mainly made of a vinyl aromatic compound and a conjugated diene compound, (b) a nonaromatic-series softener for rubber, (c) an ethylene/α-olefin copolymer, (d1) an ethylene copolymer with either/vinyl acetate (meth) acrylic acid or meth/acrylate, (e) a polypropylene resin, and (f) a modified polyethylene resin; and (g) an organic peroxide, (h) a (meth)acrylate-series and/or allyl-series crosslinking aid, and a metal hydrate (B), wherein a specific amount of the metal hydrate (B) is one pretreated with a silane coupling agents.

45 Claims, 3 Drawing Sheets

FIRE-RETARDANT RESIN COMPOSITION AND MOLDED PART USING THE SAME

FIELD OF THE INVENTION

The present invention relates to a fire-retardant resin composition having excellent mechanical characteristics, flexibility and heat resistance, as well as heat retardancy, and to a wiring material and an optical fiber cord in which said composition is used as a covering material, and other molded parts, in which no crosslinking equipment is necessary when worked.

More specifically, the present invention relates to a fire-retardant resin composition preferably suitable as a covering material for insulated wires, electric cables, and electric cords, which are used for inner and outer wiring of electric/electronic equipment, optical fiber core wires, optical fiber cords, etc., or as a molding material for power source cords, etc., or as a tube or sheet; and to a wiring material and other molded parts in which use is made of the same. More particularly, the present invention relates to a fire-retardant resin composition that is excellent in heat resistance, flexibility and resistance to scarring, which does not need a special equipment, such as a crosslinking equipment, after working, that, in particular, neither exudes heavy metal compounds nor produces a large amount of smoke or harmful gases when discarded, for example, to be buried or burned, and that can be recycled after its use, so that environmental problems may be cleared, and to a wiring material and other molded parts in which use is made of the same.

BACKGROUND OF THE INVENTION

Insulated wires, cables, and cords, which are used for inner and outer wiring of electric/electronic equipment, optical fiber cores, optical fiber cords, and the like, are required to have various characteristics, including fire retardancy, heat resistance, and mechanical characteristics (e.g. tensile properties and abrasion resistance).

For this reason, as the covering material used for these wiring materials, a polyvinyl chloride (PVC) compound and a polyolefin compound, wherein a halogen-series fire-retardant additive containing bromine atoms or chlorine atoms in the molecule is mixed, have been mainly used.

In some cases, however, when they are discarded or buried without being treated properly, the plasticizer or the heavy metal stabilizer mixed in the covering material is oozed out, or when they are burned, a harmful gas is produced from the halogen compound contained in the covering material. In some cases and in recent years, this problem has become controversial.

Therefore, wiring materials covered with a halogen-free fire-retardant material free from any risk of oozing out of toxic plasticizers or heavy metals, or generation of a halogen-series gas or the like, which involves concern about affecting the environment, are investigated.

Halogen-free fire-retardant materials secure their fire-retardancy by mixing a halogen-free fire-retardant additive in a resin. For example, a material obtained by mixing a large amount of a metal hydrate, such as aluminum hydroxide and magnesium hydroxide, as a fire-retardant additive, in an ethylene-series copolymer, such as an ethylene/1-butene copolymer, an ethylene/propylene copolymer, an ethylene/vinyl acetate copolymer, an ethylene/ethyl acrylate copolymer, and an ethylene/propylene/diene terpolymer, is used as a wiring material.

The standards, for example, of the fire retardancy, the heat resistance, and the mechanical characteristics (e.g. tensile properties and abrasion resistance) required for wiring materials of electric/electronic equipment are stipulated in UL, JIS, etc. In particular, with respect to the fire retardancy, its test method varies depending on the required level (its use to be applied) and the like. Therefore, practically, it is enough for the material to have at least the fire retardancy according to the required level. For example, mention can be made the respective fire-retardancy to pass the vertical flame test (VW-1) stipulated in UL 1581 (Reference Standard for Electrical wires, Cables, and Flexible Cords), or the horizontal test and the inclined test stipulated in JIS C 3005 (rubber/plastic insulated wire test method).

Among these, hitherto, when a halogen-free fire-retardant material is made to have a fire retardancy high enough to pass VW-1 and the inclined test, it is necessary to mix 150 to 200 parts by weight of a metal hydrate, as a fire-retardant additive, in 100 parts by weight of a resin component of an ethylene-series copolymer, such as an ethylene/1-butene copolymer, an ethylene/propylene copolymer, an ethylene/vinyl acetate copolymer, an ethylene/ethyl acrylate copolymer, and an ethylene/propylene/diene terpolymer. As a result, there is a problem that the mechanical characteristics, such as the tensile properties and the abrasion resistance, of the covering material are markedly lowered. To solve this problem, a measure is taken to lower the proportion of the metal hydrate (e.g. about 120 parts by weight of a metal hydrate, as a fire-retardant additive, to 100 parts by weight of a resin), and red phosphorus is added.

Meanwhile, wiring materials that are currently used in electric/electronic equipment, and whose covering material is a polyvinyl chloride compound or a polyolefin compound, wherein a halogen-series fire-retardant additive is mixed, are used by coloring them to be several respective colors, for example, by printing the surface of electric wires, electric cables, and electric cords, for the purpose of distinguishing the types of wiring materials and junctions.

However, halogen-free covering materials having a metal hydrate and red phosphorus mixed therein, to secure both a higher fire retardancy and mechanical characteristics, cannot be printed thereon, or they cannot be arbitrarily colored because of the color of the red phosphorus, so that they have the problem that they cannot give wiring materials that allow the types and junctions to be distinguished easily. Further, phosphorus, which will be released after discarding of the fire-retardant material containing phosphorus, poses also a problem that affects the environment; for example, pollution of water by eutrophication.

Further, wiring materials used in electric/electronic equipment are sometimes required to have a heat resistance of 80 to 105° C., or even 125° C., while in continuous use.

In that case, such a method is used where the covering material is crosslinked by an electron beam crosslinking method or a chemical crosslinking method, in order to render the wiring material highly heat resistant.

However, while the crosslinked wiring material has improved the heat resistance of the covering material, it is impossible to remelt it. Therefore it is difficult to use said material again, making the recylability thereof poor. For example, when a metal used as a conductor is recovered, the covering material has, for example, to be burned in many cases, which means that the above environmental problem involving the conventional halogen- or phosphorus-containing covering material cannot be avoided. Further, a special equipment, such as an electron beam crosslinking equipment or a chemical crosslinking equipment, has to be provided. This increases the installation cost and the cost of the resultant electrical wire, thereby degrading the general-purpose properties.

On the other hand, as a technique wherein a wiring material having a heat resistance, on the order of 80° C. to 105° C., is realized without carrying out such crosslinking, there is a technique wherein a resin having a high melting point, such as a polypropylene-series resin, is used. However, although such a resin has good heat resistance, the flexibility is poor, and when the wiring material covered with such a resin is bent, a phenomenon is observed that the surface is whitened.

This whitening phenomenon is not observed in wiring materials currently used in electric/electronic equipment and covered with a polyvinyl chloride compound. On the other hand, in the case of wiring materials covered with a halogen-free fire-retardant material wherein a large mount of a metal hydroxide is mixed, this whitening phenomenon is conspicuous regardless of whether they have been subjected to the crosslinking process or not. Thus, to use the current halogen-free fire-retardant material, which is whitened when bent, for wiring materials, further improvement has been required.

Since the service temperature of a wiring material covered with a polyvinyl chloride compound is generally on the order of 80° C. or 105° C. as a UL Standard's Temperature, a halogen-free fire-retardant material for use as a replacement for the wiring material is also required to have that heat resistance. Specifically, since, for a heat resistance of UL 80° C., for example, the heat deformation test and the heat aging test in an atmosphere at 121° C. are required, and further, for a heat resistance of UL 105° C., for example, the heat deformation test and the heat aging test in an atmosphere at 136° C. are required, the halogen-free fire-retardant material, as a replacement, is required to not melt at at least 121° C., preferably at 136° C.

In addition, molded parts, such as power source plugs, have the similar problems as the above, and the development of molded parts has been desired, which have heat resistance, flexibility, and fire retardancy, which can be recycled, and which can be remolded.

Wiring for electronic equipment that is used in electronic equipments is required to satisfy requirements stipulated under a particularly severe vertical fire-retardancy standard (UL1581 VW-1) of UL Standard. However, even if a covering material is constituted with the above-described resin having a high melting point, such as a polypropylene resin, to which a metal hydrate is added in a large amount, it is difficult to largely improve the fire-retardancy of the covering material, and therefore, it does not satisfy the requirements stipulated under the vertical fire-retardancy standard that is a severe fire-retardancy standard.

A covering material of an electrical wire used for household electric appliances is also required to satisfy dynamic properties stipulated, e.g., under UL Standard, more specifically, required to have an elongation of 100% and a tensile strength of 10.3 MPa or more. In particular, a covering material of a power code is required to further have a good flexibility because power codes are shipped in the bundled state.

On the other hand, a tube, an electrical wire part, and a sheet other than the electrical wire, and further a molded part such as a power plug are required to be similarly desirable in heating deformation characteristic, fire-retardancy, dynamic strength, and flexibility. In particular, a sheet or tube for use in protection or connection of an electrical wire or for use as a building material, is required to have a good surface flexibility and a high resistance against damage (scarring); however, a conventional halogen-free material fails to simultaneously satisfy these characteristics.

SUMMARY OF THE INVENTION

An object of the present invention is to provide a fire-retardant resin composition that solves the above problems, that is excellent in fire retardancy, heat resistance, and mechanical characteristics, and that neither exudes heavy metal compounds nor produces a large amount of smoke or harmful gases when discarded, for example, to be buried or burned, so that recent environmental problems may be cleared. Another object of the present invention is to provide a molded article that solves the above problems, that is excellent in fire retardancy, heat resistance, and mechanical characteristics, and that neither exudes heavy metal compounds nor produces a large amount of smoke or harmful gases when discarded, for example, to be buried or burned, so that recent environmental problems may be cleared. Further object of the present invention is to provide a fire-retardant resin composition having, in particular, both the high fire-retardancy and flexibility, that gives a covering material that can be remelted, to allow it to be reused; that is not whitened when bent, and that is not easily scarred, while satisfying the above characteristics. Still another object of the present invention is to provide a wiring material, an optical fiber core, an optical fiber cord, and other molded parts wherein said composition is used, respectively.

Other and further objects, features, and advantages of the invention will appear more fully from the following description, taken in connection with the accompanying drawings.

DETAILED DESCRIPTION OF THE INVENTION

Figure 1:
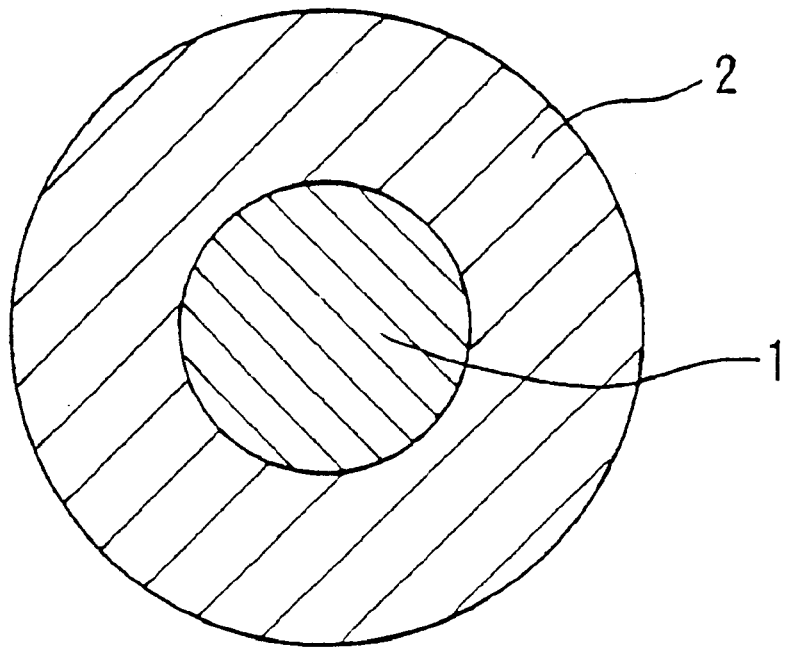
FIG. 1 is a cross-sectional view of an example of the optical fiber core wire of the present invention having a covering layer provided directly around the outer circumference of an optical fiber element wire.

To attain the above objects, in the present invention, there are provided:

(1) A fire-retardant resin composition, which comprises: a thermoplastic resin component (A) comprising (a) 5 to 55% by weight of a block copolymer made up of at least two polymer blocks A mainly made of a vinyl aromatic compound as its constitutional component and at least one polymer block B mainly made of a conjugated diene compound as its constitutional component, and/or a hydrogenated block copolymer obtained by hydrogenating the block copolymer, (b) 0 to 40% by weight of a nonaromatic-series softening agent for rubber, (c) 0 to 40% by weight of an ethylene/α-olefin copolymer, (d1) 5 to 80% by weight of at least one copolymer of an ethylene/vinyl acetate copolymer, an ethylene/(meth)acrylic acid copolymer, or an ethylene/(meth)acrylate copolymer, (e) 0 to 50% by weight of a polypropylene resin, and (f) 0 to 30% by weight of a modified polyethylene resin being modified with an unsaturated carboxylic acid or a derivative thereof; and (g) 0.01 to 0.6 parts by weight of an organic peroxide, (h) 0.03 to 1.8 parts by weight of a (meth)acrylate-series and/or allyl-series crosslinking aid, and 50 to 300 parts by weight of a metal hydrate (B), respectively to 100 parts by weight of the thermoplastic resin component (A), wherein the metal hydrate (B) is such that (i) when the metal hydrate (B) is in an amount of 50 parts by weight or more but less than 100 parts by weight, 50 parts by weight or more of the metal hydrate (B) to 100 parts by weight of the thermoplastic resin component (A) is made up of a metal hydrate that is being pretreated with a silane coupling agent; or (ii) when the metal hydrate (B) is in an amount of 100 parts by weight or more but 300 parts by weight or less, at least half of the amount of the metal hydrate (B) is made up of a metal hydrate that is being pretreated with a silane coupling agent; and the fire-retardant resin composition is a mixture of the above formulation that is heated and kneaded at a temperature equal to or higher than the melting temperature of the thermoplastic resin component (A);

(2) A fire-retardant resin composition, which comprises:

a thermoplastic resin component (A) comprising (a) 10 to 30% by weight of a block copolymer made up of at least two polymer blocks A mainly made of a vinyl aromatic compound as its constitutional component and at least one polymer block B mainly made of a conjugated diene compound as its constitutional component, and/or a hydrogenated block copolymer obtained by hydrogenating the block copolymer, (b) 0 to 20% by weight of a nonaromatic-series softening agent for rubber, (c) 0 to 20% by weight of an ethylene/α-olefin copolymer, (d1) 35 to 80% by weight of at least one copolymer of an ethylene/vinyl acetate copolymer, an ethylene/(meth)acrylic acid copolymer, or an ethylene/(meth)acrylate copolymer, (e) 0 to 35% by weight of a polypropylene resin, and (f) 0 to 30% by weight of a modified polyethylene resin being modified with an unsaturated carboxylic acid or a derivative thereof; and (g) 0.01 to 0.6 parts by weight of an organic peroxide, (h) 0.03 to 1.8 parts by weight of a (meth)acrylate-series and/or allyl-series crosslinking aid, and 50 to 300 parts by weight of a metal hydrate (B), respectively to 100 parts by weight of the thermoplastic resin component (A), wherein the metal hydrate (B) is such that (i) when the metal hydrate (B) is in an amount of 50 parts by weight or more but less than 100 parts by weight, 50 parts by weight or more of the metal hydrate (B) to 100 parts by weight of the thermoplastic resin component (A) is made up of a metal hydrate that is being pretreated with a silane coupling agent; or (ii) when the metal hydrate (B) is in an amount of 100 parts by weight or more but 300 parts by weight or less, at least half of the amount of the metal hydrate (B) is made up of a metal hydrate that is being pretreated with a silane coupling agent; and the fire-retardant resin composition is a mixture of the above formulation that is heated and kneaded at a temperature equal to or higher than the melting temperature of the thermoplastic resin component (A);

(3) A fire-retardant resin composition, which comprises:

a thermoplastic resin component (A) comprising (a) 10 to 40% by weight of a block copolymer made up of at least two polymer blocks A mainly made of a vinyl aromatic compound as its constitutional component and at least one polymer block B mainly made of a conjugated diene compound as its constitutional component, and/or a hydrogenated block copolymer obtained by hydrogenating the block copolymer, (b) 10 to 40% by weight of a nonaromatic-series softening agent for rubber, (c) 0 to 40% by weight of an ethylene/α-olefin copolymer, (d2) 5 to 50% by weight of an ethylene/propylene copolymer rubber, (e) 0 to 30% by weight of a polypropylene resin, and (f) 0 to 15% by weight of a modified polyethylene resin being modified with an unsaturated carboxylic acid or a derivative thereof; and (g) 0.01 to 0.6 parts by weight of an organic peroxide, (h) 0.03 to 1.8 parts by weight of a (meth)acrylate-series and/or allyl-series crosslinking aid, and 50 to 300 parts by weight of a metal hydrate (B), respectively to 100 parts by weight of the thermoplastic resin component (A), wherein the metal hydrate (B) is such that (i) when the metal hydrate (B) is in an amount of 50 parts by weight or more but less than 100 parts by weight, 25 parts by weight or more of the metal hydrate (B) to 100 parts by weight of the thermoplastic resin component (A) is made up of a metal hydrate that is being pretreated with a silane coupling agent; or (ii) when the metal hydrate (B) is in an amount of 100 parts by weight or more but 300 parts by weight or less, at least quarter of the amount of the metal hydrate (B) is made up of a metal hydrate that is being pretreated with a silane coupling agent; and the fire-retardant resin composition is a mixture of the above formulation that is heated and kneaded at a temperature equal to or higher than the melting temperature of the thermoplastic resin component (A);

(4) A fire-retardant resin composition, which comprises:

a thermoplastic resin component (A) comprising (a) 5 to 55% by weight of a block copolymer made up of at least two polymer blocks A mainly made of a vinyl aromatic compound as its constitutional component and at least one polymer block B mainly made of a conjugated diene compound as its constitutional component, and/or a hydrogenated block copolymer obtained by hydrogenating the block copolymer, (b) 5 to 40% by weight of a nonaromatic-series softening agent for rubber, (c) 0 to 40% by weight of an ethylene/α-olefin copolymer, (d1) 5 to 80% by weight of at least one copolymer of an ethylene/vinyl acetate copolymer, an ethylene/(meth)acrylic acid copolymer, or an ethylene/(meth)acrylate copolymer, (d2) 5 to 50% by weight of an ethylene/propylene copolymer rubber, (e) 0 to 50% by weight of a polypropylene resin, and (f) 0 to 30% by weight of a modified polyethylene resin being modified with an unsaturated carboxylic acid or a derivative thereof; and (g) 0.01 to 0.6 parts by weight of an organic peroxide, (h) 0.03 to 1.8 parts by weight of a (meth)acrylate-series and/or allyl-series crosslinking aid, and 50 to 300 parts by weight of a metal hydrate (B), respectively to 100 parts by weight of the thermoplastic resin component (A), wherein the metal hydrate (B) is such that (i) when the metal hydrate (B) is in an amount of 50 parts by weight or more but less than 100 parts by weight, 50 parts by weight or more of the metal hydrate (B) to 100 parts by weight of the thermoplastic resin component (A) is made up of a metal hydrate that is being pretreated with a silane coupling agent; or (ii) when the metal hydrate (B) is in an amount of 100 parts by weight or more but 300 parts by weight or less, at least half of the amount of the metal hydrate (B) is made up of a metal hydrate that is being pretreated with a silane coupling agent; and the fire-retardant resin composition is a mixture of the above formulation that is heated and kneaded at a temperature equal to or higher than the melting temperature of the thermoplastic resin component (A);

(5) The fire-retardant resin composition as stated in any one of the above (1) to (4), wherein the crosslinking aid (h) is a (meth)acrylate-series crosslinking aid represented by the formula:

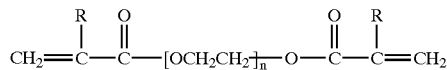

wherein R represents H or CH$_3$, and n is an integer of 1 to 9;

(6) The fire-retardant resin composition as stated in any one of the above (1) to (5), wherein the metal hydrate (B) is magnesium hydroxide;

(7) The fire-retardant resin composition as stated in any one of the above (1) to (6), wherein the silane coupling agent is a silane compound having a vinyl group and/or an epoxy group at its terminal;

(8) The fire-retardant resin composition as stated in any one of the above (1), (2), and (4) to (7), wherein the at least one copolymer of an ethylene/vinyl acetate copolymer, an ethylene/(meth)acrylic acid copolymer, or an ethylene/(meth)acrylate copolymer (d1) is an ethylene/vinyl acetate copolymer having a vinyl acetate component content of 25% by weight or more;

(9) The fire-retardant resin composition as stated in any one of the above (1), (2), and (4) to (8), further containing melamine cyanurate in an amount of 3 to 70 parts by weight, to 100 parts by weight of the thermoplastic resin component (A);

(10) The fire-retardant resin composition as stated in any one of the above (1), (2) and (4) to (9), further containing at least one selected from zinc borate, zinc stannate, and zinc hydroxystannate in an amount of 0.5 to 20 parts by weight, to 100 parts by weight of the thermoplastic resin component (A);

(11) A molded article, which has a covering layer of the fire-retardant resin composition as stated in any one of the above (1) to (10), on the outside of a conductor, or an optical fiber element wire or/and an optical fiber core wire;

(12) A molded part, which is obtained by molding the fire-retardant resin composition as stated in any one of the above (1) to (10);

(13) A method for preparing a fire-retardant resin composition that is the fire-retardant resin composition as stated in any one of the above (1) to (10), which comprises:

heating and kneading, simultaneously, at the temperature equal to or higher than the melting temperature of the resin ingredients (a) to (f), (a) the block copolymer made up of at least two polymer blocks A mainly made of a vinyl aromatic compound as its constitutional component and at least one polymer block B mainly made of a conjugated diene compound as its constitutional component, and/or the hydrogenated block copolymer obtained by hydrogenating the block copolymer, (b) the nonaromatic-series softening agent for rubber, (c) the ethylene/α-olefin copolymer, (d1) the at least one copolymer of an ethylene/vinyl acetate copolymer, an ethylene/(meth)acrylic acid copolymer, or an ethylene/(meth)acrylate copolymer and/or (d2) the ethylene/propylene copolymer rubber, (e) the polypropylene resin, (f) the modified polyethylene resin being modified with an unsaturated carboxylic acid or a derivative thereof, (g) the organic peroxide, (h) the (meth)acrylate-series and/or allyl-series crosslinking aid, and the metal hydrate (B), to carry out crosslinking; and

(14) A method for preparing a fire-retardant resin composition that is the fire-retardant resin composition as stated in any one of the above (1) to (10), which comprises:

a first step of heating and kneading (a) the block copolymer made up of at least two polymer blocks A mainly made of a vinyl aromatic compound as its constitutional component and at least one polymer block B mainly made of a conjugated diene compound as its constitutional component, and/or the hydrogenated block copolymer obtained by hydrogenating the block copolymer, (b) the nonaromatic-series softening agent for rubber, (c) the ethylene/α-olefin copolymer, (d1) the at least one copolymer of an ethylene/vinyl acetate copolymer, an ethylene/(meth)acrylic acid copolymer, or an ethylene/(meth)acrylate copolymer and/or (d2) the ethylene/propylene copolymer rubber, (e) the polypropylene resin, and (f) the modified polyethylene resin being modified with an unsaturated carboxylic acid or a derivative thereof, to obtain the thermoplastic resin component (A), and a second step of heating and kneading, at the temperature equal to or higher than the melting temperature of the thermoplastic resin component (A), the resultant resin component (A), (g) the organic peroxide, (h) the (meth)acrylate-series and/or allyl-series crosslinking aid, and the metal hydrate (B), to carry out crosslinking.

In the present invention, by properly setting, in the above-descried range, the amount of the organic peroxide contained at the same time with the resin ingredients, and the amount and the type of the crosslinking aid, it is possible to make the crosslinked structure loose and low in crosslink density, as well as by selecting a specific metal hydrate, a large amount of the metal hydrate can be added.

Hereinbelow, the present invention is described in detail.

First, the individual ingredients of the fire-retardant resin composition of the present invention are described.

(A) Thermoplastic Resin Component

The thermoplastic resin component (A) comprises (a) a block copolymer made up of at least two polymer blocks A mainly made of a vinyl aromatic compound as its constitutional component and at least one polymer block B mainly made of a conjugated diene compound as its constitutional component, and/or a hydrogenated block copolymer obtained by hydrogenating the block copolymer, (b) a nonaromatic-series softening agent for rubber, (c) an ethylene/α-olefin copolymer, (d1) at least one copolymer of an ethylene/vinyl acetate copolymer, an ethylene/(meth)acrylic acid copolymer, or an ethylene/(meth)acrylate copolymer and/or (d2) an ethylene/propylene copolymer rubber, (e) a polypropylene resin, and (f) a modified polyethylene resin being modified with an unsaturated carboxylic acid or a derivative thereof.

(a) Ingredient: Block Copolymer

The ingredient (a) for use in the present invention is a block copolymer that is made up of at least two polymer blocks A, which is mainly made of a vinyl aromatic compound as its constitutional component, and at least one polymer block B, which is mainly made of a conjugated diene compound as its constitutional component, or it is a hydrogenated block copolymer obtained by hydrogenating the block copolymer, or it is a mixture of these. Examples of the ingredient (a) include a vinyl aromatic compound/conjugated diene compound block copolymer having a structure of A-B-A, B-A-B-A, A-B-A-B-A, or the like, or one obtained by hydrogenating the block copolymer. The above (hydrogenated) block copolymer (hereinafter, by a (hydrogenated) block copolymer is meant a block copolymer and/or a hydrogenated block copolymer) contains generally 5 to 60% by weight and preferably 20 to 50% by weight of a vinyl aromatic compound.

Preferably the polymer block A mainly made of a vinyl aromatic compound as its constitutional component, consists only of a vinyl aromatic compound, or it is a copolymer block of a vinyl aromatic compound in an amount of generally 50% by weight or more and preferably 70% by weight or more with a (hydrogenated) conjugated diene compound (hereinafter, by a (hydrogenated) conjugated diene compound is meant a conjugated diene compound and/or a hydrogenated conjugated diene compound). The polymer block B mainly made of a (hydrogenated) conjugated diene compound as its constitutional component, is preferably consisted only of a (hydrogenated) conjugated diene compound, or it is a copolymer block of a (hydrogenated) conjugated diene compound in an amount of generally 50% by weight or more and preferably 70% by weight or more with a vinyl aromatic compound. In each of the polymer block A mainly made of a vinyl aromatic compound as its constitutional component and the polymer block B mainly made of a (hydrogenated) conjugated diene compound as its constitutional component, the distribution of the repeating units in the molecular chain, which are derived from the vinyl aromatic compound or the (hydrogenated) conjugated diene compound, may be a random distribution, a tapered distribution (one wherein the monomer component is increased or decreased along the molecular chain), a partial block distribution, or any combination of these. When there are two or more polymer blocks A mainly made of a vinyl aromatic compound as its constitutional component or two or more polymer blocks B mainly made of a (hydrogenated) conjugated diene compound as its constitutional component, the structures thereof are the same or different.

As the vinyl aromatic compound constituting the (hydrogenated) block copolymer, for example, one or more of styrene, α-methylstyrene, vinyltoluene, p-tert-butylstyrene, and the like can be chosen, with preference given to styrene. Further, as the conjugated diene compound, for example, one or more of butadiene, isoprene, 1,3-pentadiene, 2,3-dimethyl-1,3-butadiene, and the like are chosen, and among these butadiene, isoprene, and a combination of these are preferable.

As the microstructure of the polymer block B mainly made of a conjugated diene compound as its constitutional component, any microstructure may be chosen. For example, in the case of a polybutadiene block, those wherein a 1,2-microstructure amounts to 20 to 50% and particularly 25 to 45% are preferable, and those wherein at least 90% of aliphatic double bonds derived from butadiene are hydrogenated are preferable. In the case of a polyisoprene block, those wherein 70 to 100% by weight of the isoprene compound has a 1,4-microstructure and at least 90% of aliphatic double bonds derived from the isoprene compound is hydrogenated are preferable.

The weight-average molecular weight of the (hydrogenated) block copolymer used in the present invention that has the above structure, is preferably in the range of 5,000 to 1,500,000, more preferably 10,000 to 550,000, further preferably 100,000 to 550,000, and particularly preferably 100,000 to 400,000. The molecular weight distribution (the ratio (Mw/Mn) of the weight-average molecular weight (Mw) to the number-average molecular weight (Mn)) is preferably 10 or less, more preferably 5 or less, and further preferably 2 or less. The molecular structure of the (hydrogenated) block copolymer may be a straight-chain structure, a branched-chain structure, a radial structure, or any combination thereof.

As the method for preparing the (hydrogenated) block copolymer, many methods have been proposed, and as a representative method, for example, a method described in JP-B-40-23798 ("JP-B" means examined Japanese patent publication) can be used, by which method block polymerization in an inactive solvent is carried out using a lithium catalyst or a Ziegler-type catalyst, to obtain the block copolymer. Further, for example, the block copolymer obtained by the above method may be hydrogenated in an inactive solvent, in the presence of a hydrogenation catalyst, to obtain a (hydrogenated) block copolymer.

As specific examples of the above (hydrogenated) block copolymer, SBS (styrene/butadiene block copolymer), SIS (styrene/isoprene block copolymer), SEBS (hydrogenated SBS), and SEPS (hydrogenated SIS) can be mentioned. In the present invention, a particularly preferable (hydrogenated) block copolymer is a hydrogenated block copolymer that comprises a polymer block A mainly made of styrene as its constitutional component and a polymer block B mainly made of isoprene as its constitutional component, wherein 70 to 100% by weight of isoprene has a 1,4-microstructure and at least 90% of aliphatic double bonds derived from the isoprene is hydrogenated, and it has a weight-average molecular weight of 50,000 to 550,000. More preferably in the above hydrogenated block copolymer, 90 to 100% by weight of isoprene has a 1,4-microstructure.

The amount of the ingredient (a) to be used is, in the thermoplastic resin component (A), in a range of 5 to 55% by weight. If the amount of the ingredient (a) is less than 5% by weight, not only the mechanical strength and elongation are largely reduced, but also the ingredient (b) is bled, the heating deformation characteristic is largely reduced, and the heat-resistance characteristic is lowered. If the amount is more than 55% by weight, not only the extrusion-moldability is significantly reduced but also the fire-retardancy, etc. is significantly reduced.

In the case of using the ethylene/propylene copolymer rubber of the ingredient (d2), the amount of the ingredient (a) to be added is, in the thermoplastic resin component (A), in a range of 10 to 40% by weight. When using the ethylene/propylene copolymer rubber, the (a) ingredient is to be used in an amount of 10% by weight or more, in the thermoplastic resin component (A), for the purpose of inhibiting bleeding of the nonaromatic-series softener for rubber that is added to reduce extrusion load.

In order to obtain a wiring material exhibiting a vertical fire-retardancy that is a high fire-retardancy, while keeping other properties, such as mechanical strength, heat-deformation characteristic and extrusion-moldability, the amount of the ingredient (a) to be used in the resin component (A) is preferably in a range of 10 to 30% by weight.

(b) Ingredient: Nonaromatic-series Softening Agent (Softener) for Rubber

As the ingredient (b) for use in the present invention, a nonaromatic-series mineral oil, or liquid or low-molecular-weight synthetic softener can be used.

The mineral oil softener used for rubbers is a combined mixture of three of an aromatic ring, a naphthene ring, and a paraffin chain, which is distinguished as follows: one wherein the number of carbon atoms of the paraffin chain amounts to 50% or more of the total number of carbon atoms is referred to as paraffinic-series, one wherein the number of carbon atoms of the naphthene ring amounts to 30 to 40% of the total number of carbon atoms is referred to as naphthenic-series, and one wherein the number of carbon atoms of the aromatic ring amounts to 30% or more is referred to as aromatic-series.

The mineral-oil-series softener for rubber used as the ingredient (b) for use in the present invention, is one that is paraffinic-series or naphthenic-series as distinguished above. The use of an aromatic-series softener makes the ingredient (a) soluble, to inhibit the crosslinking reaction, which is unpreferable because the physical properties of the obtainable composition cannot be improved. As the ingredient (b), a paraffinic-series softener is preferable, and among paraffinic-series softeners, one having less aromatic ring component is particularly preferable.

Preferably the properties of these nonaromatic-series softeners for rubber are such that the kinetic viscosity at 37.8° C. is 20 to 500 cSt, the pour point is −10 to −15° C., and the flash point (COC) is 170 to 300° C.

The amount of the ingredient (b) to be used is, in the thermoplastic resin component (A), in a range of 0 to 40% by weight. If the amount of the ingredient (b) is more than 40% by weight, not only the mechanical strength is largely reduced, but also the fire-retardancy and the heating deformation characteristic are largely lowered. In the case of using the ethylene/propylene copolymer rubber of the ingredient (d2), the amount of the ingredient (b) to be added is, in the thermoplastic resin component (A), in a range of 10 to 40% by weight. Since when the ethylene/propylene copolymer rubber is added, extrudability is conspicuously lowered; therefore, in this case, the (b) ingredient is to be used in an amount of 10% by weight or more, in the thermoplastic resin component (A), for the purpose of improving extrudability.

In order to obtain a wiring material exhibiting a vertical fire-retardancy that is a high fire-retardancy, while keeping other properties, such as mechanical strength, heat-deformation characteristic and extrusion-moldability, the amount of the ingredient (b) to be used in the resin component (A) is preferably in a range of 0 to 20% by weight.

Part of the ingredient (b) can be added after the heat treatment in the presence of the peroxide, but it may cause bleed-out in some cases.

Preferably the ingredient (b) has a weight-average molecular weight of 100 to 2,000.

(c) Ingredient: Ethylene/α-Olefin Copolymer

As the ingredient (c) for use in the present invention, an ethylene/α-olefin copolymer is used.

Preferably the ethylene/α-olefin copolymer (c) is a copolymer of ethylene with an α-olefin having 4 to 12 carbon atoms, and as specific examples of the α-olefin, can be mentioned 1-butene, 1-hexene, 4-methyl-1-pentene, 1-octene, 1-decene, and 1-dodecene.

The ethylene/α-olefin copolymer includes, for example, LLDPE (straight-chain low-density polyethylene), LDPE (low-density polyethylene), VLDPE (very low density polyethylene), EBR (ethylene/butadiene rubber), and an ethylene/α-olefin copolymer synthesized in the presence of a single site catalyst. Out of these, the ethylene/α-olefin copolymer synthesized in the presence of a single site catalyst is preferable.

Preferably the density of the ethylene/α-olefin copolymer (c) is 0.925 g/cm³ or less, more preferably 0.915 g/cm³ or less, and particularly preferably 0.905 g/cm³ or less. This is because there arises a problem that as the density becomes high, the addition of a large amount of the metal hydrate (high loading) becomes difficult, to thereby lower the flexibility of the resultant resin composition and the wiring material covered with the resin composition. There is no particular lower limit to the density, but generally the lower limit is about 0.850 g/cm³.

Further, preferably the ethylene/α-olefin copolymer (c) has a melt flow index (ASTM D-1238) of 0.5 to 30 g/10 min.

As the ethylene/α-olefin copolymer for use in the present invention, can be mentioned, for example, one that is synthesized in the presence of a single site catalyst, a usual straight-chain low-density polyethylene or very-low-density polyethylene. Among the above, the ethylene/α-olefin copolymer synthesized in the presence of a single site catalyst is preferable; as the production method of the same, a known method described, for example, in JP-A-6-306121 ("JP-A" means unexamined published Japanese patent application) or JP-T-7-500622 ("JP-T" means a published Japanese translation of PCT international application) can be used.

The single site catalyst is one whose polymerization active point is single and it is high in polymerization activity, and the single site catalyst is also called as a metallocene catalyst or a Kaminsky catalyst. The ethylene/α-olefin copolymer synthesized using this catalyst is characterized in that the molecular distribution and the composition distribution are narrow.

Since the ethylene/α-olefin copolymer synthesized in the presence of such a single site catalyst has, for example, a high tensile strength, tear strength, and impact strength, when it is used in a halogen-free fire retardant material (a covering material of a wiring material) that is required to be highly filled with a metal hydrate, there is obtained an advantage that the lowering of the mechanical characteristics due to the highly filled metal hydrate can be minimized.

In contrast, in comparison with the use of the usual ethylene/α-olefin copolymer, the use of the ethylene/α-olefin copolymer synthesized using a single site catalyst causes an increase in melt viscosity or a decrease in melt tension, causing a problem with moldability. In this regard, there is one wherein the moldability is improved by introducing long-chain branches using an asymmetric catalyst as a single site catalyst (Constrained Geometory Catalystic Technology) or forming two peaks in the molecular weight distribution by connecting two polymerization tanks at the time of the polymerization (Advanced Performance Terpolymer).

Preferably, the ethylene/α-olefin copolymer (c) synthesized in the presence of a single site catalyst used in the present invention, is the above one improved in moldability, and as examples thereof "AFFINITY" and "ENGAGE" (trade names) from Dow Chemical Co. and "EXACT" (trade name) from Exxon Chemical Co. are put on the market.

The amount of the ingredient (c) to be used is, in the thermoplastic resin component (A), in a range of 0 to 40% by weight, preferably 0 to 30% by weight, and more preferably 0 to 20% by weight. If the amount of the ingredient (c) is too large, not only the fire-retardancy is lowered, but also the heating deformation characteristic is lowered. The ingredient (c) is not an essential ingredient in the present invention, but it acts to improve mechanical strength.

In order to obtain a wiring material exhibiting a vertical fire-retardancy that is a high fire-retardancy, the amount of the ingredient (c) to be used in the resin component (A) is preferably in a range of 0 to 20% by weight.

(d1) Ingredient: at Least One Copolymer of an Ethylene/vinyl Acetate Copolymer, an Ethylene/(meth)acrylic Acid Copolymer, or an Ethylene/(meth)acrylate Copolymer As the ingredient (d1) for use in the present invention, use can be made of at least one copolymer selected from a group consisting of an ethylene/vinyl acetate copolymer, an ethylene/(meth)acrylic acid copolymer, and an ethylene/(meth)acrylate copolymer (e.g. an ethylene/butyl acrylate copolymer, an ethylene/ethyl acrylate copolymer, an ethylene/methyl acrylate copolymer, and an ethylene/methyl methacrylate copolymer). Among those, to further improve the fire-retardancy, the ethylene/vinyl acetate copolymer is preferably used.

To further improve the fire-retardancy, the content of a copolymer component other than ethylene is preferably in a range of 23 wt % or more, more preferably 25 wt % or more, and further preferably 28 wt % or more. For example, when an ethylene/vinyl acetate copolymer is used, the content of the vinyl acetate (VA) component is preferably in a range of 23 wt % or more. Also, MFR is preferably in a range of 0.3 or more from the viewpoint of flowability, and it is preferably in a range of 30 or less from the viewpoint of obtainment of sufficient mechanical strength.

The amount of the ingredient (d1) to be added in the thermoplastic resin component (A) is in a range of 5 to 80 wt %, and preferably 15 to 65 wt %. If the amount of the ingredient (d1) to be added is less than 5 wt %, the dynamic strength, elongation, and the flexibility is reduced, as well as the fire-retardancy is conspicuously lowered. To ensure the vertical fire-retardancy of the wiring material, the amount of the ingredient (d1) to be added in the thermoplastic resin component (A) is set to be in a range of 35 wt % or more. If the amount is more than 80 wt %, the heat deformation characteristic, heat-resistance characteristic and extrusion characteristic are conspicuously lowered.

(d2) Ingredient: Ethylene/propylene Copolymer Rubber

The ethylene/propylene copolymer rubber (EPM) that is used as the base resin of the fire-retardant thermoplastic resin composition of the present invention, is a rubber-like copolymer of ethylene and propylene. Herein, the ethylene/propylene copolymer rubber means one in which the content of the ethylene component is generally in the order of 40 to 75 wt %. Although there is an ethylene/propylene terpolymer (EPDM) containing a repeating unit having an unsaturated group, as a third component contained in the polymer, other than ethylene and propylene, it is required to use the EMP with no double bond in the present invention. This is because the use of the EPDM fails to attain the object of the present invention, that is to exhibit a good flexibility and a good elongation. The EPM may be singly used, or a mixture of two kinds or more of the EPMs may be used.

The content of the ethylene component in the ethylene/propylene copolymer rubber is generally in a range of 85 to 40 wt %, preferably 80 to 45 wt %, and more preferably 75 to 50 wt %. If the content of the ethylene component is too small, the flexibility of the resultant resin composition is insufficient, while if the content is too large, the mechanical strength thereof is reduced.

The Mooney viscosity, $M_{L1+4}$ (100° C.) of the ethylene/propylene copolymer rubber is preferably in a range of 10 to 120, and more preferably 40 to 100. If the Mooney viscosity is less than 10, the rubber elasticity of the resultant elastomer composition may be degraded, while if it is more than 120, the moldability may be degraded, in some cases, thereby particularly the outer appearance of the molded product may be degraded.

The weight-average molecular weight of the ethylene/propylene copolymer rubber used in the present invention is preferably in a range of 50,000 to 1,000,000, and more preferably 70,000 to 500,000. If the weight-average molecular weight is less than 50,000, the rubber elasticity of the resultant composition may be degraded, while if it is more than 1,000,000, the moldability may be degraded, thereby particularly the outer appearance of the molded product may be degraded, in some cases.

The amount of the ethylene/propylene copolymer rubber to be added in the thermoplastic resin component (A) is in a range of 5 to 50 wt %, and preferably 15 to 40 wt %. If the ingredient (d2) is less than 5 wt %, elongation and flexibility are reduced, while if it is too large, the dynamic strength is reduced.

In the fire-retardant resin composition of the present invention, at least one kind of the ingredient (d1) and/or the ingredient (d2) is used. Alternatively, each one of the ingredients (d1) and (d2) may be respectively singly used, or the mixture of the ingredients (d1) and (d2) may be used. In the case of using the ingredients (d1) and (d2) in the form of the mixture, the amounts to be added of the ingredient (d1) and the ingredient (d2) in the thermoplastic resin component (A) are preferably in a range of 5 to 80 wt % and in a range of 5 to 50 wt %, respectively.

(e) Ingredient: Polypropylene Resin

As the polypropylene resin that can be used in the present invention, can be mentioned, for example, a homopolypropylene, an ethylene/propylene random copolymer, an ethylene/propylene block copolymer, and a copolymer of propylene with a small amount of another α-olefin (e.g., 1-butene, 1-hexene, and 4-methyl-1-pentene).

Herein, the ethylene/propylene random copolymer means one in which the content of the ethylene component is in a range of about 1 to 4 wt %, and the ethylene/propylene block copolymer means one in which the content of the ethylene component is in a range of about 5 to 20 wt %.

In the present invention, the ingredient (e), a polypropylene resin, can be used in such a way that part thereof is added after the heating and kneading, in the preparation of the thermoplastic resin component (A) that is heated and kneaded to form a partially crosslinked product.

The polypropylene resin mixed in (A) before the heating and kneading is thermally decomposed due to the presence of the ingredient (e) in the subsequent heating and kneading, thereby the molecular weight is suitably lowered.

As the polypropylene resin that is mixed before the heating and kneading, preferably one having an MFR (ASTM-D-1238, L conditions, 230° C.) of 0.1 to 10 g/10 min, more preferably 0.1 to 5 g/10 min, and further preferably 0.1 to 3 g/10 min is used.

If the MFR of the polypropylene resin is less than 0.1 g/10 min, even after the heat treatment, the molecular weight of the polypropylene resin is not lowered, making the moldability of the obtainable resin composition poor in some cases, whereas if the MFR of the polypropylene resin is over 10 g/10 min, the molecular weight is too lowered, making the rubber elasticity of the obtainable resin composition poor in some cases.

As the polypropylene resin that is mixed after the heating and kneading, one that meets the conditions at the time of extrusion for the formation of a covering layer is suitable, and preferably the MFR is 5 to 200 g/10 min, more preferably 8 to 150 g/10 min, and further preferably 10 to 100 g/10 min.

When the mixing is carried out after the heating and kneading, if the MFR of the polypropylene resin is less than 5 g/10 min, the moldability of the obtainable resin composition is made poor in some cases, whereas if the MFR is over 200 g/10 min, the rubber elasticity of the obtainable resin composition is made poor in some cases.

The amount of the ingredient (e) to be added in the thermoplastic resin component (A) is in a range of 0 to 50 wt %, and preferably 0 to 35 wt %. If the amount is more than 50 wt %, not only the resultant resin composition becomes conspicuously hard, but also the dynamic strength is reduced and there arises a problem that scar apts to easily occur on the surface of the resultant resin composition.

In order to obtain a wiring material exhibiting a vertical fire-retardancy that is a high fire-retardancy, while keeping other properties, such as mechanical strength, heating deformation characteristic and extrusion-moldability, the amount of the ingredient (e) to be used in the thermoplastic resin component (A) is preferably in a range of 0 to 35 wt %.

In the case of using the ethylene/propylene copolymer rubber of the ingredient (d2), the amount of the ingredient (e) to be added in the thermoplastic resin component (A) is preferably in a range of 0 to 30 wt %.

Meantime, although the ingredient (e) serves to make the extrudability of the resin composition favorable with the heat resistance secured, the ingredient (e) can be omitted if a high heat resistance is not needed. If the ingredient (e) is not used, generally the amount of the ingredient (b) to be used is controlled, to secure a resin composition good in extrudability in its entirety.

Further, in order to obtain a wiring material exhibiting the heating deformation characteristic (136° C.) of the electrical wire as stipulated in the UL 105° C. standard, it is particularly preferable to use at least one of homopolypropylene and the ethylene/propylene block copolymer, as the polypropylene resin. The amount of the at least one of homopolypropylene and the ethylene/propylene block copolymer to be added in the thermoplastic resin component (A) is preferably in a range of 15 wt % or more.

(f) Ingredient: Polyolefin Resin Modified with an Unsaturated Carboxylic Acid or Its Derivative Specific examples of the polyolefin resins to be modified with an unsaturated carboxylic acid or its derivative include, such polyolefins as straight-chain polyethylene, ultralow density polyethylene, and high density polyethylene. In the present invention, the ingredient (f) means one of the above polyolefin resins modified with an unsaturated carboxylic acid or its derivative (which are hereinafter referred to as "an unsaturated carboxylic acid or the like"). Specific examples of the unsaturated carboxylic acids used for modification of the above polyolefin resin include maleic acid, itaconic acid, and fumaric acid. Specific examples of the derivatives of the unsaturated carboxylic acids include maleic acid monoesters, maleic acid diesters, maleic anhydrate, itaconic acid monoesters, itaconic acid diesters, itaconic anhydrate, fumaric acid monoesters, fumaric acid diesters, and fumaric anhydrate. A polyolefin can be modified with an unsaturated carboxylic acid or the like, by, for example, heating and kneading the polyolefin and the unsaturated carboxylic acid or the like under the presence of an organic peroxide. The amount modified with maleic acid is generally in a range of about 0.1 to 7 wt %.

The addition of the polyolefin resin modified with the unsaturated carboxylic acid or the like is effective to increase the elongation of the resultant resin composition while ensuring mechanical strength thereof, and also to ensure a high volume resistivity value thereof. The polyolefin-series resin modified with the unsaturated carboxylic acid or the like is also effective to relieve the reduction in mechanical properties due to addition of the metal hydrate and to prevent occurrence of whitening of the resultant electrical wire when bent.

The amount of the ingredient (f) to be added in the thermoplastic resin component (A) is in a range of 0 to 30 wt %. In the case of using the ethylene/propylene copolymer rubber of the ingredient (d2), the amount of the ingredient (f) to be added in the thermoplastic resin component (A) is in a range of 0 to 15 wt %. The ingredient (f) is not necessarily an essential ingredient; however, to obtain the above effects, it may be preferable to add the ingredient (f). If the amount of the ingredient (f) to be used is too large, not only the fire-retardancy is conspicuously reduced but also the extrusion-moldability into the electrical wire may be largely lowered, in some cases.

(g) Ingredient: Organic Peroxide

As the organic peroxide that can be used in the present invention, can be mentioned, for example, dicumyl peroxide, di-tert-butyl peroxide, 2,5-dimethyl-2,5-di-(tert-butyl peroxy)hexane, 2,5-dimethyl-2,5-di(tert-butyl peroxy)hexine-3, 1,3-bis(tert-butyl peroxyisopropyl)benzene, 1,1-bis(tert-butyl peroxy)-3,3,5-trimethylcyclohexane, n-butyl-4,4-bis(tert-butyl peroxy)valerate, benzoyl peroxide, p-chlorobenzoyl peroxide, 2,4-dichlorobenzoyl peroxide, tert-butyl peroxybenzoate, tert-butyl peroxyisopropyl carbonate, diacetyl peroxide, lauroyl peroxide, and tert-butylcumyl peroxide.

Out of these, 2,5-dimethyl-2,5-di-(tert-butyl peroxy) hexane and 2,5-dimethyl-2,5-di-(tert-butyl peroxy)hexine-3 are most preferable, in view of the odor, the coloration, and the scorch stability.

The amount of the organic peroxide (e) to be added, to 100 parts by weight of the thermoplastic resin component (A), is in the range of 0.01 to 0.6 part by weight, and preferably 0.03 to 0.5 part by weight. By choosing the organic peroxide in this range, a partially crosslinked composition excellent in extrudability can be obtained without granular structure to occur, because the crosslinking does not proceed excessively.

(h) Ingredient: (Meth)acrylate-Series and/or Allyl-Series Crosslinking Aid

In the preparation of the fire-retardant resin composition of the present invention or the thermoplastic resin component (A) used therein, a partially crosslinked structure is formed between the vinyl aromatic thermoplastic elastomer and the ethylene/α-olefin copolymer through a crosslinking aid, in the presence of the organic peroxide. As the crosslinking aid used at that time, a (meth)acrylate-series crosslinking aid represented by the formula:

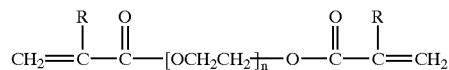

wherein R represents a hydrogen atom or a methyl group, and n is an integer of 1 to 9, can be mentioned. Herein, by the (meth)acrylate-series crosslinking aid is meant acrylate-series and methacrylate-series crosslinking aids. Specifically, ethylene glycol dimethacrylate, diethylene glycol dimethacrylate, triethylene glycol dimethacrylate, a polyethylene glycol dimethacrylate, trimethylolpropane trimethacrylate, and allyl methacrylate can be mentioned.

In addition, those having an allyl group at the terminal, such as diallyl fumarate, diallyl phthalate, tetraallyl oxyethane, and triallyl cyanurate, can be used.

Out of the above, particularly a (meth)acrylate-series crosslinking aid wherein n is 1 to 6 is preferable, including ethylene glycol diacrylate, triethylene glycol dimethacrylate, and tetraethylene glycol dimethacrylate.

Particularly, in the present invention, triethylene glycol dimethacrylate is most preferable, because it can be easily handled, its compatibility with other ingredients is good, it has a peroxide solubilizing action, and it acts as a dispersing aid of the peroxide, to make the crosslinking effect at the time of the heating and kneading uniform and effective, to give a partially crosslinked thermoplastic resin whose hardness and rubber elasticity are balanced. By using such a compound, the crosslinking does not become insufficient or excessive, and therefore a uniform and efficient partial crosslinking reaction can be expected at the time of the heating and kneading.

The amount to be added of the crosslinking aid used in the present invention is preferably in the range of 0.03 to 1.8 parts by weight and more preferably 0.05 to 1.6 parts by weight, to 100 parts by weight of the thermoplastic resin component (A). By choosing the crosslinking aid in this range, the crosslinking proceeds moderately to give a partially crosslinked structure low in crosslinkage density without crosslinking becoming excessive, and a composition excellent in extrudability can be obtained without granular structure to occur. The amount of the crosslinking aid to be added is preferably about 1.5 to 4.0 times, the amount of the organic peroxide to be added, in terms of weight.

(B) Metal Hydrate

The metal hydrate that can be used in the present invention includes, but is not particularly limited to, for example, compounds having a hydroxyl group or water of crystallization, such as aluminum hydroxide, magnesium hydroxide, aluminum silicate hydrate, magnesium silicate hydrate, basic magnesium carbonate, and hydrotalcite, which can be used singly or as a combination of two or more. Among these metal hydrates, aluminum hydroxide and magnesium hydroxide are preferable. It is required that at least part of the metal hydrate be treated with a silane coupling agent, but a metal hydrate whose surface is not treated or a metal hydrate whose surface is treated with another surface-treating agent, such as an aliphatic acid, can additionally be used.

As the silane coupling agent used in the surface treatment of the above metal hydrate, a crosslinking silane coupling agent is preferable, for example, a silane coupling agent having a vinyl group or an epoxy group at the terminal, such as vinyltrimethoxysilane, vinyltriethoxysilane, glycidoxypropyltrimethoxysilane, glycidoxypropyltriethoxysilane, glycidoxypropylmethyldimethoxysilane, methacryloxypropyltrimethoxysilane, methacryloxypropyltriethoxysilane, and methacryloxypropylmethyldimethoxysilane; a silane coupling agent having a mercapto group at the terminal, such as mercaptopropyltrimethoxysilane and mercaptopropyltriethoxysilane; and a silane coupling agent having an amino group, such as aminopropyltriethoxysilane, aminopropyltrimethoxysilane, N-(β-aminoethyl)-γ-aminopropyltripropyltrimethoxysilane, and N-(β-aminoethyl)-γ-aminopropyltripropylmethyldimethoxysilane. Further, these silane coupling agents can be used as a combination of two or more.

Among these crosslinking silane coupling agents, silane coupling agents having an epoxy group and/or a vinyl group at their terminal are more preferable, and these may be used singly or as a combination of two or more.

As the magnesium hydroxide whose surface is treated with a silane coupling agent and that can be used in the present invention, can be mentioned those obtained by surface-treating one whose surface is untreated (e.g., commercially available Kisma 5 (trade name, manufactured by Kyowa Kagaku Co.)), one whose surface is treated with an aliphatic acid, such as stearic acid, oleic acid, or the like (e.g., Kisma 5A (trade name, manufactured by Kyowa Kagaku Co.)), and one that is treated with a phosphate, with the above silane coupling agent; and a commercially available product of magnesium hydroxide whose surface has been already treated with a silane coupling agent (e.g., Kisma 5LH and Kisma 5PH (trade names, manufactured by Kyowa Kagaku Co.)).

In addition to the above ones, for example, use can be made of a metal hydrate obtained by surface-treating magnesium hydroxide or aluminum hydroxide part of whose surface is pretreated previously with an aliphatic acid, a phosphate, or the like, with a silane coupling agent having a functional group, such as a vinyl group and an epoxy group, at the terminal.

When a metal hydrate is treated with a silane coupling agent, the metal hydrate is required to be blended with the silane coupling agent previously. At that time, the silane coupling agent is added suitably in an amount sufficient for the surface treatment, and specifically it is added preferably in an amount of 0.2 to 2% by weight based on the metal hydrate. The silane coupling agent may be used in the form of a stock liquid or a liquid diluted with a solvent.

The amount of the metal hydrate to be added in the resin composition of the present invention is 50 to 300 parts by weight, to 100 parts by weight of the thermoplastic resin component (A). In the present invention, (i) if the amount of the metal hydrate to be added is 50 parts by weight or more but less than 100 parts by weight, 50 parts by weight or more of the metal hydrate to 100 parts by weight of the thermoplastic resin component (A) is to be one pretreated with a silane coupling agent, or (ii) if the amount of the metal hydrate to be added is 100 parts by weight or more to 100 parts by weight of the thermoplastic resin component (A), at least half of that amount is to be one pretreated with a silane coupling agent, thereby a large amount of a filler can be blended with the resin, without lowering the mechanical strength, even if a large amount of the metal hydrate is added.

When the ingredient (d1) is not used but the ingredient (d2) is used, the amount of the metal hydrate to be added is also in a range of 50 to 300 parts by weight, to 100 parts by weight of the thermoplastic resin component (A): in this case, (i) if the amount of the metal hydrate to be added is in a range of 50 parts by weight or more but less than 100 parts by weight, 25 parts by weight or more of the metal hydrate to 100 parts by weight of the thermoplastic resin component (A) is made to a metal hydrate being pre-treated with a silane coupling agent; or (ii) if the amount of the metal hydrate is in a range of 100 to 300 parts by weight, at least one-fourth of the amount of the metal hydrate is made to a metal hydrate being pre-treated with a silane coupling agent, thereby it being possible to give a fire-retardant resin composition with flexibility.

If a usual polyolefin resin, such as a polyethylene resin and a polypropylene resin, is used as a base resin and a large amount of a metal hydrate is added in order to satisfy the required fire retardancy, the mechanical strength is lowered very much. In contrast, the thermoplastic resin component (A) in the present invention is excellent in filler acceptability, since the crosslink density is low and the resin ingredients are in a partially crosslinked state through the ingredient (f). Accordingly, when such a thermoplastic resin component (A) is used as a base resin, a large amount of a metal hydrate can be mixed. In particular, only when a specified amount of a metal hydrate being treated with a silane coupling agent is mixed, since the base resin of the component (A) has interaction with the metal hydrate of the component (B) through a silan coupling agent, the lowering of the mechanical strength is minimized, whitening difficultly occurs when bent, and satisfactory characteristics for covering materials of wiring materials, molded parts, etc. can be obtained.

Although the detailed reaction mechanism when heated/kneaded the resin composition of the present invention has not been clear yet, it is assumed as follows. Melting and kneading the thermoplastic resin component (A) in the present invention causes the ingredient (a), the ingredient (c), and the ingredient (d1) and/or the ingredient (d2) to be crosslinked through the ingredient (h), in the presence of the ingredient (g). On the other hand, if there is the ingredient (e), by the action of the ingredient (g), (e) is made to convert to have the molecular weight lowered suitably, so that the melt viscosity of the resultant resin composition can be suitably controlled. Also by the ingredient (b) the melt viscosity of the resin composition can be controlled. Therefore the resultant composition gives a crosslinked product excellent in extrudability in its entirety. Such crosslinking of the composition of the present invention can be referred to as partial crosslinking, since the number of crosslinked points is less in comparison to the usual crosslinking. One of reasons on the above is that crosslinking is carried out in the presence of a small amount of the ingredient (g).

The degree of crosslinking of the fire-retardant resin composition can be represented, as a scale, by a gel fraction and a dynamic elastic modulus of the thermoplastic resin component (A). The gel fraction can be represented by a ratio of the weight of solid residue to 1 g of a sample, wherein the solid residue is obtained in such a manner that 1 g of the sample is wrapped in a wire net (100 mesh) and it is extracted in boiling xylene for ten hours using a Soxhlet's extractor. The dynamic elastic modulus can be represented by a storage elastic modulus of melting viscoelasticy using a parallel plate.

The degree of crosslinking in the present invention is preferably 30 to 45% by weight, and more preferably 40 to 45% by weight, in terms of the gel fraction; and it is preferably $10^5$ to $10^7$ Pa in terms of the storage elastic modulus.

When the thermoplastic resin component (A) is filled with the metal hydrate, only when a specific amount of a metal hydrate treated with a silane coupling agent is added, simultaneously with the ingredient (g) and the ingredient (h), the metal hydrate can be added in a large amount without impairing the extrudability at the time of molding. In that case, as a result, a fire-retardant resin composition can be obtained that has heat resistance and mechanical characteristics with excellent fire retardancy and flexibility retained, that can be reextruded after its use, and that can be recycled.

Although the detailed mechanism wherein a metal hydrate treated with a silane coupling agent acts has not been clear yet, the mechanism is assumed as follows. The silane coupling agent that has been bonded to the metal hydrate surface as a result of the treatment with the silane coupling agent acts such that the alkoxy group at one terminal is bonded to the metal hydrate and various reactive sites including the vinyl group and the epoxy group being present at the other terminal are bonded to the uncrosslinked parts of the ingredient (a) of a vinyl aromatic thermoplastic elastomer, and the ingredient (c), the ingredient (d1), and the ingredient (d2). Thus, a large amount of a metal hydrate can be added without impairing extrudability, the adhesion between the resin and the metal hydrate is made strong, and a fire-retardant resin composition that is good in mechanical strength and abrasion resistance and that is difficultly scarred can be obtained.

(C) Melamine Cyanurate Compound

The melamine cyanurate compound used in the present invention is preferably small in particle size thereof. The average particle size of the melamine cyanurate compound used in the present invention is preferably in a range of 10 μm or less, more preferably 7 μm or less, further preferably 5 μm or less. From the viewpoint of dispersibility, the melamine cyanurate compound is preferably being subjected to surface-treatment.

As the melamine cyanurate compound that can be used in the present invention, can be mentioned, for example, commercially available ones under the trade name of MCA-0 or MCA-1 (manufactured by Mitsubishi Chemical, Ltd.), or ones sold on the market by Chemie Linz Gmbh. As the melamine cyanurate compounds subjected to surface-treatment with a fatty acid and the melamine cyanurate compounds subjected to surface-treatment with a silane coupling agent, can be mentioned, for example, commercially available ones under the trade names of MC610 and MC640 (manufactured by Nissan chemical, Ltd.), respectively.

As the melamine cyanurate compound that can be used in the present invention, can be mentioned, for example, a melamine cyanurate having the structure as shown below:

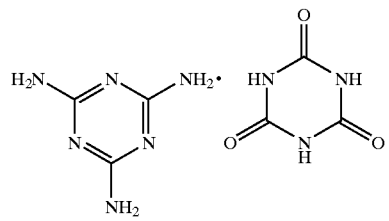

In the present invention, the amount of the melamine cyanurate compound to be added is generally 3 to 70 parts by weight, and preferably 5 to 40 parts by weight, to 100 parts by weight of the thermoplastic resin component (A). If the amount of the melamine cyanurate compound is too small, the effect of improving the fire-retardancy cannot be obtained, while if the amount is too large, the dynamic strength, particularly the elongation is reduced and thereby the outer appearance of the resultant electrical wire becomes poor.

(D) At Least One Selected from Zinc Borate, Zinc Stannate and Zinc Hydroxystannate To the fire-retardant resin composition of the present invention, if necessary, can be added at least one selected from a group consisting of zinc borate, zinc stannate and zinc hydroxystannate, to further improve fire-retardancy. The addition of the above compound is effective to increase the speed of shell formation upon burning and to make stronger the shell thus formed. As a result, it is possible to drastically improve the fire-retardancy in co-operation with the melamine cyanurate compound having a property of generating a gas from its inside upon burning, and hence to give a high fire-retardancy to the resultant resin composition.

With respect to zinc borate, zinc stannate or zinc hydroxystannate used in the present invention, the average particle size thereof is preferably 5 μm or less, more preferably 3 μm or less.

Specific examples of zinc borate that can be used in the present invention include Alkanex FRC-500 (2ZnO/

$3B_2O_3 \cdot 3.5H_2O$) or Alkanex FRC-600 (trade names, manufactured by Mizusawa Chemicals, Ltd.). As zinc stannate ($ZnSnO_3$) and zinc hydroxystannate ($ZnSn(OH)_6$), there can be mentioned Alkanex ZS and Alkanex ZHS (trade names, manufactured by Mizusawa Chemicals, Ltd.), respectively.

In the present invention, the amount of zinc borate, zinc stannate or zinc hydroxystannate to be added is generally 0.5 to 20 parts by weight, and preferably 2 to 15 parts by weight, to 100 parts by weight of the thermoplastic resin component (A). If the amount is too small, the effect of improving the fire-retardancy cannot be exhibited, while if the amount is too large, the dynamic strength, particularly the elongation is reduced so that the outer appearance of the resultant electrical wire becomes poor.

Into the fire-retardant resin composition of the present invention, can be blended various additives generally used in electric wires, electric cables, electric cords, tubes, electric wire parts, sheets, and the like, such as an antioxidant, a metal inactivator, a fire-retardant (auxiliary) additive, a filler, and a lubricant, in the range wherein the purpose of the present invention is not damaged.

As the antioxidant, can be mentioned, for example, an amine-series antioxidant, such as a polymer of 2,2,4-trimethyl-1,2-dihydroquinone, 4,4'-dioctyl.diphenylamine, and N,N'-diphenyl-p-phenyldiamine; a phenol-series antioxidant, such as pentaerythrityl-tetrakis(3-(3,5-di-t-butyl-4-hydroxyphenyl)propionate), octadecyl-3-(3,5-di-t-butyl-4-hydroxyphenyl)propionate, and 1,3,5-trimethyl-2,4,6-tris(3,5-di-t-4-butyl-4-hydroxybenzyl)benzene; and a sulfur-series antioxidant, such as a bis(2-methyl-4-(3-n-alkylthiopropionyloxy)-5-t-butylphenyl)sulfide, 2-mercaptobenzimidazole and its zinc base, and pentaerythritol-tetrakis(3-lauryl-thiopropionate).

As the metal inactivator, can be mentioned, for example, N,N'-bis(3-(3,5-di-t-butyl-4-hydroxyphenyl)propionyl) hydrazine, 3-(N-salicyloyl)amino-1,2,4-triazole, and 2,2'-oxamidobis-(ethyl 3-(3,5-di-t-butyl-4-hydroxyphenyl) propionate).

Further, as the fire-retardant (auxiliary) additive and the filler, can be mentioned, for example, carbon, clay, zinc oxide, tin oxide, titanium oxide, magnesium oxide, molybdenum oxide, antimony trioxide, a silicone compound, quartz, talc, calcium carbonate, magnesium carbonate, and white carbon.

Particularly, a silicone compound, such as a silicone rubber and a silicone oil, has such an effect that it not only gives or improves fire retardancy, but also it controls the adhesion between the insulator (the covering layer containing the fire-retardant resin composition) and the conductor in the case of electric wires and cords as well as it gives lubricity in the case of cables, to reduce external scars. Specific examples of such a silicone compound that can be used in the present invention include such commercially available products as "SFR-100" (trade name, manufactured by GE Co.) and "CF-9150" (trade name, manufactured by Toray Dow Silicone Co.).

If added, the silicone compound is added preferably in an amount of 0.5 to 5 parts by weight to 100 parts by weight of the thermoplastic resin component (A). If the amount is less than 0.5 part by weight, it is not substantially effective for fire retardancy and lubricity. On the other hand, if the amount is over 5 parts by weight, the outer appearance of electric wires, cords, and cables is deteriorated and the extruding speed is lowered to make the productivity poor in some cases.

As the lubricant, can be mentioned, for example, a hydrocarbon-series lubricant, an aliphatic acid-series lubricant, an aliphatic acid amide-series lubricant, an ester-series lubricant, an alcohol-series lubricant, and a metal soap-series lubricant.

Into the fire-retardant resin composition of the present invention, can be introduced the above additive and another resin in the range wherein the purpose of the present invention is not impaired, but at least the above thermoplastic resin component (A) is to be its major resin components. Herein, "to be its major resin components" means that the above thermoplastic resin component (A) amounts to generally 70% by weight or more, preferably 85% by weight or more, and more preferably all of the resin components, in the resin components of the fire-retardant resin composition of the present invention. Herein, in the thermoplastic resin component (A), the ingredients (a), (b), (c), (d1) and/or (d2), (e), and (f) each have the amount to be used within the range as specified in the above, and the sum total of the amounts of the ingredients (a) to (f) is 100% by weight of the thermoplastic resin component (A).

Hereinbelow, the method for preparing the fire-retardant resin composition of the present invention is described.

The ingredients (a) to (f), the metal hydrate (B), and the ingredient (g) and the ingredient (h) are added, heated, and kneaded. The kneading temperature is preferably 160 to 240° C. The kneading conditions, such as a kneading temperature and a kneading time, can be set, so that it is enough to melt the resin ingredient (a) to (f), to realize the necessary partial crosslinking by the action of the organic peroxide. As the kneading method, a means usually used for rubbers, plastics, and the like can be satisfactorily used and, for example, as an apparatus, a single-screw extruder, a double-screw extruder, a roll, a Banbury mixer, or various kneaders can be used. In this process, a fire-retardant resin composition wherein the ingredients are uniformly dispersed can be obtained.

Among the metal hydrate to be added, it is important that the metal hydrate treated with a silane coupling agent is one that has previously been treated with a silane coupling agent. By using a previously surface-treated metal hydrate, a metal hydrate can be added in an amount enough to secure fire retardancy. Therefore, a fire-retardant resin composition that is particularly good in mechanical strength and abrasion resistance and is difficultly scarred can be obtained.

As another method, the ingredients (a) to (f) are heated and kneaded in a first step, to obtain the thermoplastic resin component (A). In a second step, the ingredients (g) and (h) and the metal hydrate (B) are added to the thermoplastic resin component (A) obtained in the first step and they are heated and kneaded. At that time, the temperature is preferably 160 to 240° C. Also in this case, the kneading conditions, such as a kneading temperature and a kneading time, can be set, so that the thermoplastic resin component (A) can be melted and the organic peroxide contained can be used enough to carry out crosslinking.

In this way, it is possible that after the ingredients (a) to (f) are previously heated and kneaded to micro-disperse them, the ingredients (g) and (h) are added and they are heated and kneaded. In this case also, when the metal hydrate whose surface is treated is added, it is required that before the addition the metal hydrate be surface-treated previously.

The fire-retardant resin composition of the present invention is suitable for wiring materials used in inner and outer wiring of electric/electronic equipment, and for covering or preparing molded parts including optical fiber core wires, optical fiber cord wires, etc.

When the fire-retardant resin composition of the present invention is used as a covering material of a wiring material, there is no particular restriction except that the outer circumference of a conductor is provided with at least one covering layer made of the above fire-retardant resin composition of the present invention, preferably formed by extrusion coating. As the conductor, for example, any known one, such as a solid wire or a stranded wire of annealed copper, can be used. Further, as the conductor, a conductor plated with tin or having an enameled insulating layer can be used, in addition to an open wire.

The wiring material of the present invention can be prepared by extrusion-coating the circumference of a conductor or an insulated wire, with the fire-retardant resin composition of the present invention, by using a general-purpose extrusion-coating apparatus. At that time, the temperature of the extrusion-coating apparatus is preferably about 180° C. at the cylinder part and about 200° C. at the crosshead part.

In the wiring material of the present invention, the thickness of the insulating layer (a covering layer made of the fire-retardant resin composition of the present invention) formed around the conductor is not particularly limited, but it is generally of the order of 0.15 to 5 mm.

Further, in the wiring material of the present invention, although the fire-retardant resin composition of the present invention that is a partially crosslinked product, is preferably extrusion-coated to form a covering layer as it is, it is also possible to further crosslink the extruded covering layer in order to improve the heat resistance further. However, if this crosslinking is carried out, it becomes difficult to reuse (recycle) the covering layer as an extrusion material.

As a method for crosslinking, the usually practiced electron beam irradiation crosslinking method and chemical crosslinking method can be employed.

In the case of the electron beam crosslinking method, after the fire-retardant resin composition of the present invention is extruded to form a covering layer, it is irradiated with an electron beam in a usual manner, to carry out the crosslinking. The dosage of the electron beam is suitably 1 to 30 Mrad, and in order to carry out the crosslinking efficiently, the fire-retardant resin composition that will constitute the covering layer may be blended with, as a crosslinking aid, a polyfunctional compound, such as a methacrylate-series compound (e.g. trimethylolpropane triacrylate), an allyl-series compound (e.g. triallyl cyanurate), a maleimide-series compound, and a divinyl-series compound.

In the case of the chemical crosslinking method, the fire-retardant resin composition is blended with an organic peroxide as a crosslinking agent, and after the extrusion is carried out to form a covering layer, it is subjected to crosslinking by heating in a usual manner.

The shape of the molded part of the present invention is not particularly restricted, and examples of it include a power source plug, a connector, a sleeve, a box, a tape base material, a tube, a sheet, and the like. The molded part of the present invention is molded out of the fire-retardant resin composition of the present invention by a molding method, such as usual injection-molding.

The above sheet, tube, or the like can be extruded out in accordance with the same manner as that for covering an electrical wire. Also, like the electrical wire, cross-linking may be carried out by chemical crosslinking or electron beam crosslinking.

In the case of obtaining an injection-molded part, for example an electrical wire part, as a molded part of the present invention, injection-molding can be carried out at a cylinder temperature of about 220° C. and at a head temperature of about 230° C. As an injection-molding apparatus, can be employed an injection-molding apparatus that is generally used for molding a PVC resin or the like, to mold out the molded part.

The optical fiber core wire or the optical cord of the present invention is produced, by extrusion-coating the fire-retardant resin composition of the present invention, using a general-purpose extrusion-coating apparatus, to form a covering layer around an optical fiber element wire, or around an optical fiber core wire having tensile strength fibers placed along it or intertwined therewith. At that time, the temperature of the extrusion-coating apparatus is preferably about 180° C. at the cylinder section and about 200° C. at the crosshead section.

The optical fiber core wire of the present invention is used as it is, without providing a further covering layer around it in some applications.

Meantime, the optical fiber core wire or cord of the present invention includes all that has the covering around the optical fiber element wire or core wire with the covering layer made of the fire-retardant resin composition of the present invention, and its structure is not particularly restricted. The thickness of the covering layer, the type and amount of the tensile strength fibers placed along or intertwined with the optical fiber core wire, etc. varies, for example, depending on the type and application of the optical fiber cord and they can be set arbitrarily.

Figure 2:
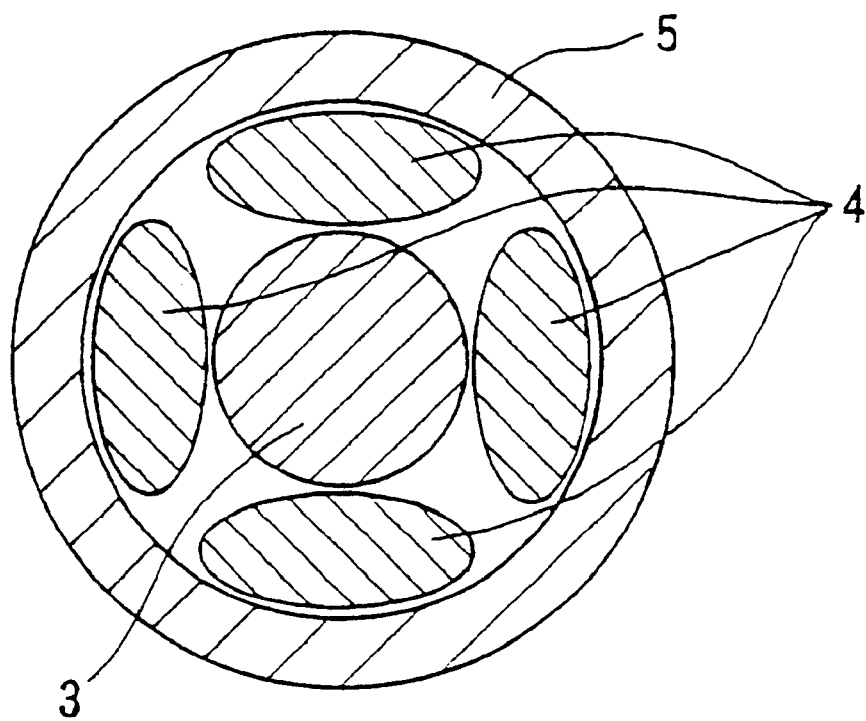
FIG. 2 is a cross-sectional view of an example of the optical fiber cord of the present invention wherein a covering layer is formed around the outer circumference of one optical fiber core wire along which a plurality of tensile strength fibers are placed (in a longitudinal direction).
Figure 3:
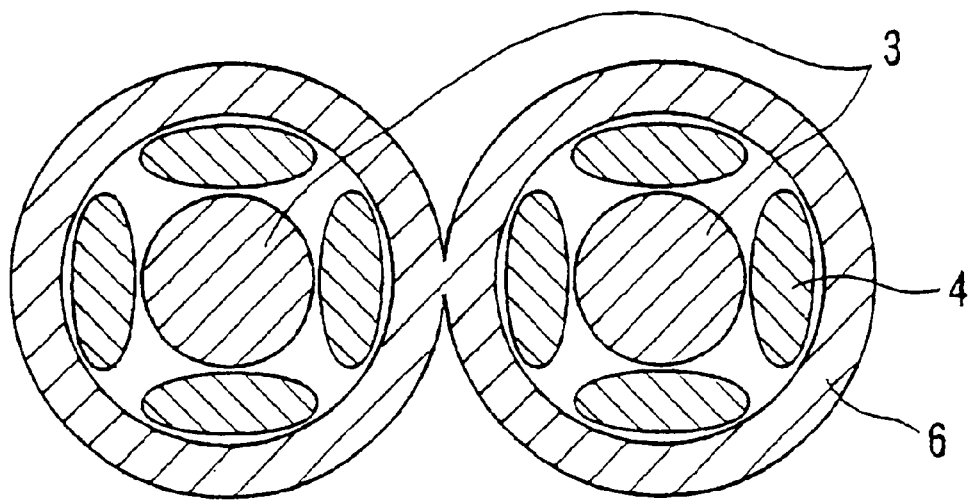
FIG. 3 is a cross-sectional view of another example of the optical fiber cord of the present invention wherein a plurality of tensile strength fibers are placed along each of the outer-circumferences of two optical fiber core wires and a covering layer is formed around the resulting outer circumferences.

FIGS. 1 to 3 show examples of the structure of the optical fiber core wire and cord of the present invention.

FIG. 1 is a cross-sectional view of an example of the optical fiber core wire of the present invention, wherein the outer circumference of an optical fiber elemental wire 1 is directly provided with a covering layer 2 made of the fire-retardant resin composition.

FIG. 2 is a cross-sectional view of an example of the optical fiber cord of the present invention, wherein a covering layer 5 is formed on the outer circumference of one optical fiber core wire 3 having a plurality of tensile strength fibers 4 placed along it longitudinally.

FIG. 3 is a cross-sectional view of an example of the optical fiber cord (optical fiber two-core cord) of the present invention, wherein a plurality of tensile strength fibers 4 are placed along each of the outer circumferences of two optical fiber core wires 3 and 3, and a covering layer 6 is formed on each of the outer circumferences thereof.

The fire-retardant resin composition of the present invention is made up of a halogen-free fire-retardant material not containing phosphorus; accordingly, not only is the composition excellent in mechanical characteristics, fire retardancy, heat resistance, and flexibility, but also it neither exudes harmful heavy metal compounds nor produces a large amount of smoke or harmful gases (corrosive gases) when discarded, for example, to be buried or burned.

Further, the wiring material of the present invention is excellent in mechanical characteristics, fire retardancy, and heat resistance, as well as flexibility, and particularly it is not whitened when bent. Thus, the wiring material of the present invention is a halogen-free fire-retardant wiring material not containing phosphorus that is excellent in both flexibility and mechanical strength.

Further, since the covering layer of the wiring material of the present invention has a high heat resistance of UL 105° C., and it can be made of a remeltable material as a covering material, a wiring material can be provided that is rich in recyclability, in comparison to conventional wiring materials covered with a current covering material that is a crosslinked product.

Thus, the wiring material of the present invention is very useful as a wiring material for electric/electronic equipment, such as power source cables, wherein environmental problems are taken into consideration.

Further, the fire-retardant resin composition of the present invention is preferably suitable as a covering material for such a wiring material, an optical fiber core wire, and an optical fiber cord, as a material for molded parts, and also as a tube material, as well as a tape material.

Hereinbelow, the present invention is described in more detail with reference to the following examples, but the invention is not limited to those.

EXAMPLES

In the followings, unless otherwise stated, numerical values mean part(s) by weight.

Examples 1 to 46 and Comparative Examples 1 to 28

Use was made of, as the ingredient (a), a hydrogenated styrene/ethylene/propylene/styren copolymer (SEPS), as the ingredient (b), a paraffin oil, as the ingredient (c), an ethylene/1-octene copolymer having a density of 0.87 g/cm$^3$ (c-1) or an ethylene/1-octene copolymer having a density of 0.915 g/cm$^3$ (c-2), as shown in Tables 1–11, as the ingredient (d1), an ethylene/vinyl acetate copolymer having a vinyl acetate (VA) component content of 33% by weight (d-1), an ethylene/vinyl acetate copolymer having a VA component content of 41% by weight (d-2), an ethylene/vinyl acetate copolymer having a VA component content of 28% by weight (d-3), or an ethylene/ethyl acrylate copolymer having an ethyl acrylate (EA) component content of 25% by weight (d-4), as shown in Tables 1–11, as the ingredient (d2), an ethylene/propylene copolymer rubber (EPM) having an ethylene component content of 73% by weight (d-5), an ethylene/propylene copolymer rubber (EPM) having an ethylene component content of 52% by weight (d-6), or an ethylene/propyleneter polymer (EPDM) having an ethylene component content of 66% by weight (d-7), as shown in Tables 1 to 11, as the ingredient (e), a block polypropylene (e-1) or a random polypropylene (e-2), as shown in Tables 1–11, as the ingredient (f), a maleic acid-modified polyethylene (modification amount 4%), as the ingredient (g), 2,5-dimethyl-2,5-di(t-butylperoxy)-hexane, as the ingredient (h), triethylene glycol dimethacrylate, and as the component (B), magnesium hydroxide whose surface had been treated with a vinyl silane (B-1), magnesium hydroxide whose surface had been treated with an aliphatic acid (B-2), or untreated magnesium hydroxide (B-3) and a silane coupling agent, and these components were blended in the amount to be added as shown in Tables 1–11, to prepare compositions, respectively.

In Examples 4, 8, 14, 34, 36, and 39, the ingredients (a) to (f) were dry blended at room temperature and were heated and kneaded at 200° C. in a Banbury mixer, to prepare a thermoplastic resin component (A), respectively. Then, the organic peroxide (g), the crosslinking aid (h), and the metal hydrate (B) were charged and they were kneaded in the Banbury mixer and were discharged, to obtain a fire-retardant resin composition, respectively. The discharge temperature was 200° C.

In Examples 19 and 20, the metal hydrate (B) was placed in a blender and the silane coupling agent was added, dropwise, with stirring, so that the metal hydrate was treated with the silane coupling agent previously. The thus-obtained metal hydrate, whose surface had thus been treated with the silane coupling agent, and all the other components were dry blended at room temperature, were heated and kneaded in a Banbury mixer at 200° C., and then were discharged, to obtain fire-retardant resin compositions. The discharge temperature was 200° C.

In other Examples and Comparative Examples (excluding Comparative Examples 12 and 13), all the components were dryblended at room temperature, were heated and kneaded in a Banbury mixer at 200° C., and then were discharged, to obtain fire-retardant resin compositions. The discharge temperature was 200° C.

In Comparative Example 12, after all the components, except the organic peroxide and the silane coupling agent, were heated and kneaded in a Banbury mixer, the organic peroxide and the silane coupling agent were charged, followed by kneading.

In Comparative Example 13, after all the components except the metal hydrate were kneaded in a Banbury mixer, the metal hydrate was mixed, followed by kneading and discharging, to obtain a fire-retardant resin composition.

From the thus-obtained resin compositions, 1-mm sheets corresponding to the Examples and the Comparative Examples were obtained by pressing.

Then, using an extrusion-coating apparatus for production of electric wires, each of the resin compositions for insulation-covering that had been previously melted was extruded to cover a conductor (a stranded annealed copper wire with tinning having a diameter of 1.14 mm$\phi$ and composed of 30 wires each having a diameter of 0.18 mm$\phi$), to prepare insulated wires having an outer diameter of 2.74 mm, respectively corresponding to Examples 1 to 16 and 18 to 46 and Comparative Examples 1 to 28.

Further, using a general-purpose extrusion-coating apparatus, the thus-obtained composition was extruded to form a covering in thickness of 0.35 mm around the outer circumference of an optical fiber polyamine (nylon) core wire (3) having an outer diameter ($\phi$) of 0.90 mm along which tensile strength fibers (aramid fibers) (4) were placed, to make an optical fiber cord having the structure as shown in FIG. 2; alternatively, the thus-obtained composition was made to cover directly an optical fiber element wire (1) having a diameter of $\phi$0.25 mm, to make an optical fiber core wire having an outer diameter of 0.9 mm and having the structure as shown in FIG. 1 (Examples 1, 8, 26, and 46).

Further, using the thus-obtained composition in Examples 17, described in Table 3, injection-molding with an injection-molding machine was made on power source plug terminals having two electric wires connected thereto, wherein the electric wires were produced in accordance with Example 1, to produce a power source plug. This power source plug was molded at an injection-molding temperature of 230° C.

As to the thus-obtained sheets, the tensile properties (extension (elongation) (%) and tensile strength (MPa)), the heat deformation property, and the hardness were evaluated. The results are also shown in Tables 1 to 11. The properties were evaluated on the basis of JIS K 6723 and the heat deformation test was carried out at 121° C. The hardness was evaluated on the basis of JIS K 7215 A-type.

As to properties of the sheets, it was judged to pass the tests, when the extension was 100% or more, when the tensile strength was 10 MPa or more, and when the heat deformation rate was 30% or less, and when the hardness was 95 A or less when ethylene/propylene rubber was contained to give further flexibility.

Further, regarding the covering layers of the thus-obtained insulated wires, the tensile properties, the abrasion resistance, the horizontal flame test, the vertical flame test, the 60°-inclined flame test, the heat deformation rate test, the whitening test (whether there was observed a whitening phenomenon when bent), the extrudability test, and the outer appearance observation were carried out, to evaluate these properties. The results are also shown in Tables 1 to 11.

Regarding the tensile properties, the mechanical strength (the tensile strength) (MPa) and the breaking extension (elongation) (%) of the insulators (covering layers) of the insulated wires were measured under conditions with the bench mark distance being 25 mm and the rate of pulling being 50 mm/min. The extension is required to be 100% or more and the mechanical strength is required to be 10 MPa or more.

Figure 4:
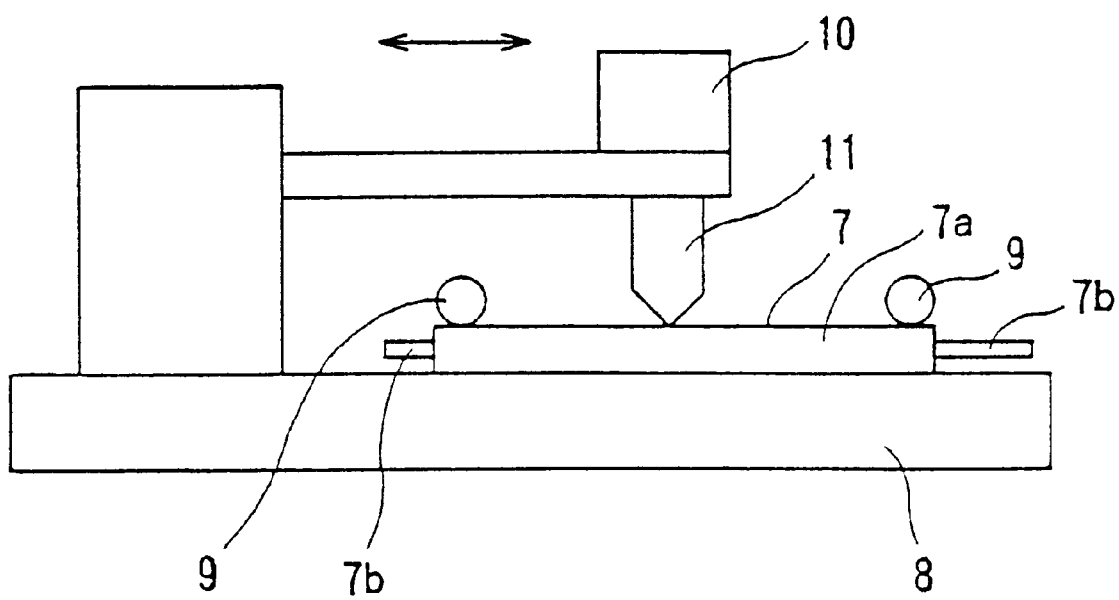
FIG. 4 is a front view of an apparatus for testing abrasion resistance.
Figure 5:
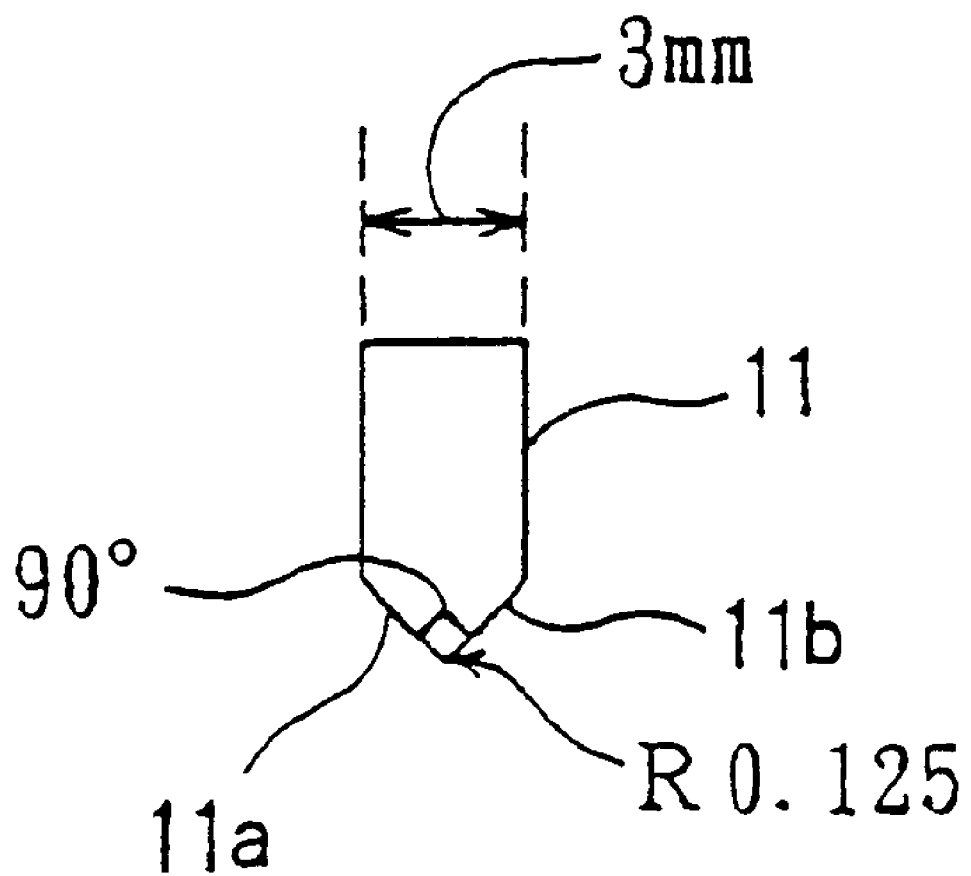
FIG. 5 is a front view of the blade in the apparatus for testing abrasion resistance, as shown in FIG. 4.

The abrasion resistance was evaluated using the test apparatus whose front view is shown in FIG. 4. The insulated wire (7), cut to a length of 75 cm with the conductor (7b) exposed by removing the insulating-covering layer (7a) at both of the opposite ends, was fixed on a horizontal table (8) with a clamp (9); and then a blade (11) was moved back and forth alternately (in the direction shown by the arrow in the figure) 50 to 60 times per minute, over a length of 10 mm or more along the longitudinal direction of the insulated wire, with a load (10) of 700 gf being applied, until the insulating-covering layer was removed by the abrasion to allow the blade to come in contact with the conductor of the electric wire, the number required of the reciprocative movements of the blade being counted. A front view of the blade is shown in FIG. 5, wherein the blade (11) has a blade section having a width of 3 mm defined by two faces (11a, 11b) forming an angle of 90° and the curvature radius (R) of the tip of the blade section is 0.125 mm. The one wherein the number of the reciprocative movements of the blade at which it came in contact with the conductor of the electric wire was 1,000 or more was rated "○", the one wherein that number was 500 or more but less than 1,000 was rated "Δ", and the one wherein that number was less than 500 was rated "X" which meant an unacceptable one. The ratings "○" and "Δ" are on the practically acceptable level and show that they are qualified (passed the test).

In the horizontal flame test, the insulated wires were subjected to the horizontal flame test stipulated in JIS C 3005, and when the burning went out by itself within 30 sec, it was judged to pass the test, and the number passed the test out of ten samples was counted and shown in Tables.

In the 60-degree flame test, the insulated wires were subjected to the 60°-inclined flame test stipulated in JIS C 3005, and when the burning went out by itself within 30 sec, it was judged to pass the test, and the number passed the test out of ten samples was counted and shown in Tables.

The vertical flame test was carried out on the basis of the vertical flame test (VW-1) of UL 1581.

Further, with respect to fire retardancy, it is not necessary to pass all of the above three kinds of flame tests. When all samples to be tested were passed the test of the horizontal flame test, it is judged to pass the fire retardancy.

The heat deformation rate was measured by carrying out the deformation test of UL1581 with the temperature being 121° C. and the load being 500 gf, to obtain the rate (%) of the deformation after the heating to before the heating. The one having a heat deformation rate of 50% or more cannot be practically used.

The whitening phenomenon whether it would be observed or not, was evaluated by the observation whether there was whitening when the insulated wire was wound around a mandrel having the same diameter as that of the insulated wire. After winding 6 times, if there was no whitening, it was rated "○", if there was observed whitening from 1 time upto 5 times, it was rated "Δ", and if there was whitening 6 times or more, it was rated "X" The one rated "X" is practically unpreferable.

In the extrudability test, the extrusion was carried out with a 30-mmφ diameter extruding machine; when the extrusion could be carried out with the motor load in the normal range and the outer appearance was good, it was rated "○", when the extrusion was carried out with the extrusion load being a little large or the outer appearance was a little poor, it was rated "Δ", and when the extrusion load was conspicuously large and the extrusion was difficult or impossible, it was rated "X". The ratings "○" and "Δ" are on the practically acceptable level with no problems to occur and are judged to pass the test.

The outer appearance of the insulated wires was examined by visually observing whether there would be a change of the outer diameter of the insulated wire, and the surface state of the insulated wire. If the results of the visual observation was good, it was designated to as "○". On the contrary, if the outer diameter was varied and unstable, the surface roughening was occurred, or occurrence of bleed was observed, it was designated to as "X".

The compounds that were used, as shown in Tables 1 to 11, were as follows:

The Thermoplastic Resin Component (A)
Ingredient (a): a Hydrogenated Block Copolymer
    Manufacturing company: Kuraray Co., Ltd.
    Trade name: Septon 4077
    Type: a styrene/ethylene/propylene/styrene copolymer
    Styrene component content: 30% by weight
    Isoprene component content: 70% by weight
    Weight-average molecular weight: 320,000
    Molecular weight distribution: 1.23
    Hydrogenated rate: 90% or more
Ingredient (b): a Nonaromatic-series Softener for Rubber
    Manufacturing company: Idemitsu Kosan Co., Ltd.
    Trade name: Diana Process Oil PW-90
    Type: a paraffin-series oil
    Weight-average molecular weight: 540
    Aromatic component content: 0.1% or less
Ingredient (c): a Single Site catalyst-series Ethylene/α-olefin Copolymer
(c-1)
    Manufacturing company: Dow Chemical Japan Ltd.
    Trade name: ENGAGE EG8100
    Type: an ethylene/1-octene copolymer
    Density: 0.870 g/cm$^3$
(c-2)
    Manufacturing company: Dow Chemical Ltd.
    Trade name: AFFINITY FM1570
    Type: an ethylene/1-octene copolymer
    Density: 0.915 g/cm$^3$
Ingredient (d1)
(d-1)
    Manufacturing company: Mitsui DuPont Polychemicals, Co.
    Trade name: EV-170
    Type: an ethylene/vinyl acetate copolymer
    VA component content: 33% by weight (d-2)
  Manufacturing company: Mitsui DuPont Polychemicals, Co.
  Trade name: EV-40LX
  Type: an ethylene/vinyl acetate copolymer
  VA component content: 41% by weight (d-3)
  Manufacturing company: Mitsui DuPont Polychemicals, Co.
  Trade name: V-421
  Type: an ethylene/vinyl acetate copolymer
  VA component content: 28% by weight (d-4)
  Manufacturing company: Mitsui DuPont Polychemicals, Co.
  Trade name: A714
  Type: an ethylene/ethyl acrylate copolymer
  EA component content: 25% by weight Ingredient(d2)

(d-5)
  Manufacturing company: JSR
  Trade name: EP07P
  Type: an ethylene/propylene copolymer rubber (EPM)
  Ethylene component content: 73% by weight (d-6)
  Manufacturing company: JSR
  Trade name: EP11
  Type: an ethylene/propylene copolymer rubber (EPM)
  Ethylene component content: 52% by weight (d-7)
  Manufacturing company: JSR
  Trade name: EP57P
  Type: an ethylene/propylene terpolymer (EPDM)
  Ethylene component content: 66% by weight Ingredient (e): a Polypropylene Resin (e-1)
  Manufacturing company: Tokuyama Co.
  Trade name: PN610S
  Type: a block polypropylene
  Density: 0.9 g/cm$^3$ (e-2)
  Manufacturing company: Grand Polymer Co.
  Trade name: F229D
  Type: a random polypropylene
  Density: 0.9 g/cm$^3$ Ingredient (f): a Maleic Acid-modified Polyethylene
  Manufacturing company: Mitsui Chemicals, Inc.
  Trade name: ADMER XE070
  Type: a maleic acid-modified polyethylene (LLDPE)

Ingredient (g): an Organic Peroxide
  Manufacturing company: Nippon Oil and Fats Co., Ltd.
  Trade name: Perhexa 25B
  Type: 2,5-dimethyl-2,5-di(t-butylperoxy)-hexane Ingredient (h): a Crosslinking Aid
  Manufacturing company: Shin-Nakamura Kagaku Co.
  Trade name: NK Ester 3G
  Type: triethylene glycol dimethacrylate (B) Metal Hydrate (B-1)
  Manufacturing company: Kyowa Chemical Co., Ltd.
  Trade name: Kisma 5LH
  Type: magnesium hydroxide whose surface was treated with a silane coupling agent having a vinyl group at the terminal (B-2)
  Manufacturing company: Kyowa Chemical Co., Ltd.
  Trade name: Kisma 5B
  Type: magnesium hydroxide treated with an aliphatic acid (B-3)
  Manufacturing company: Kyowa Chemical Co., Ltd.
  Trade name: Kisma 5
  Type: untreated magnesium hydroxide Other Components Melamine Cyanulate
  Manufacturing company: Nissan Chemical Co., Ltd.
  Trade name: MC640
  Type: melamine cyanulate Zinc Hydroxystannate
  Manufacturing company: Mizusaswa Chemical Co., Ltd.
  Trade name: Alkanex ZHS
  Type: zinc hydroxystannate Silane Coupling Agent
  TSL8350 (trade name)
    Manufacturing company: Toshiba Silicone Co., Ltd.
    Type: a silane coupling agent having an epoxy group at the terminal
  TSL8370 (trade name)
    Manufacturing company: Toshiba Silicone Co., Ltd.
    Type: a silane coupling agent having a vinyl group at the terminal A Phenol-series Antioxidant
  Manufacturing company: Ciba-Geigy Co.
  Trade name: Irganox 1010
  Type: pentaerythritol tetrakis(3-(3,5-di-t-butyl-4-hydroxyphenyl)propionate)

Lubricant
  Manufacturing company: Hoechst Co.
  Trade name: Wax OP
  Type: montanoic acid-saponified ester wax

TABLE 1

|  |  | Example 1 | Example 2 | Example 3 | Example 4 | Example 5 | Example 6 | Example 7 |
|---|---|---|---|---|---|---|---|---|
| a | SEPS | 15 | 8 | 9 | 25 | 10 | 15 | 10 |
| b | Paraffin oil | 5 | 2 | 2 | 10 | — | 5 | 10 |
| c-1 | Ethylene/α-olefin copolymer (0.870) | — | — | — | — | — | — | — |
| c-2 | Ethylene/α-olefin copolymer (0.915) | — | — | — | — | — | — | — |
| d-1 | Ethylene/vinyl acetate copolymer (VA = 33 wt %) | 50 | 60 | 74 | — | 67 | 45 | 50 |
| d-2 | Ethylene/vinyl acetate copolymer (VA = 41 wt %) | — | — | — | 40 | — | — | — |
| d-3 | Ethylene/vinyl acetate copolymer (VA = 28 wt %) | — | — | — | — | — | — | — |
| d-4 | Ethylene/ethyl acrylate copolymer (EA = 25 wt %) | — | — | — | — | — | — | — |
| e-1 | Block polypropylene | 25 | 25 | 10 | 20 | 18 | 30 | 5 |
| e-2 | Random polypropylene | — | — | — | — | — | — | — |
| f | Maleic acid-modified LLDPE | 5 | 5 | 5 | 5 | 5 | 5 | 25 |
| g | Organic peroxide | 0.2 | 0.2 | 0.2 | 0.2 | 0.2 | 0.2 | 0.2 |
| h | Crosslinking aid | 0.6 | 0.6 | 0.6 | 0.6 | 0.6 | 0.6 | 0.6 |
| B-1 | Kisma 5LH | 250 | 250 | 250 | 240 | 250 | 250 | 250 |
| B-2 | Kisma 5B | — | — | — | — | — | — | — |
| B-3 | Kisma 5 | — | — | — | — | — | — | — |
|  | Melamine cyanurate | — | — | — | 30 | — | — | — |
|  | Alkanex ZHS | — | — | 5 | — | — | — | — |
|  | TSL8370 | — | — | — | — | — | — | — |
|  | Antioxidant | 1 | 1 | 1 | 1 | 1 | 1 | 1 |
|  | Lubricant | 2 | 2 | 2 | 2 | 2 | 2 | 2 |
| Properties of the sheet | Extension (%) | 140 | 140 | 150 | 110 | 150 | 130 | 150 |
|  | Tensile strength (MPa) | 13 | 14 | 12 | 11 | 13 | 12 | 15 |
|  | Heat deformation 121° C. | 11 | 11 | 14 | 11 | 13 | 9 | 14 |
| Characteristics of the electric wire | Extension (%) | 150 | 150 | 140 | 100 | 160 | 140 | 150 |
|  | Tensile strength (MPa) | 14 | 14 | 12 | 11 | 16 | 12 | 15 |
|  | Horizontal flame test | 10/10 | 10/10 | 10/10 | 10/10 | 10/10 | 10/10 | 10/10 |
|  | Vertical flame test | 10/10 | 10/10 | 10/10 | 10/10 | 10/10 | 10/10 | 10/10 |
|  | Abrasion resistance | ○ | ○ | ○ | ○ | ○ | ○ | ○ |
|  | Whitening | ○ | ○ | ○ | ○ | ○ | ○ | ○ |
|  | Heat deformation (%) | 19 | 18 | 21 | 18 | 19 | 17 | 22 |
|  | Extrudability | ○ | ○ | ○ | ○ | Δ | ○ | Δ |

TABLE 2

|  |  | Example 8 | Example 9 | Example 10 | Example 11 | Example 12 | Example 13 | Example 14 |
|---|---|---|---|---|---|---|---|---|
| a | SEPS | 15 | 50 | 20 | 40 | 15 | 10 | 10 |
| b | Paraffin oil | 10 | 20 | 15 | 35 | 5 | 5 | 5 |
| c-1 | Ethylene/α-olefin copolymer (0.870) | 20 | — | — | — | — | — | — |
| c-2 | Ethylene/α-olefin copolymer (0.915) | — | — | — | — | — | — | — |
| d-1 | Ethylene/vinyl acetate copolymer (VA = 33 wt %) | — | 20 | 60 | 20 | 50 | 75 | 75 |
| d-2 | Ethylene/vinyl acetate copolymer (VA = 41 wt %) | 40 | — | — | — | — | — | — |
| d-3 | Ethylene/vinyl acetate copolymer (VA = 28 wt %) | — | — | — | — | — | — | — |
| d-4 | Ethylene/ethyl acrylate copolymer (EA = 25 wt %) | — | — | — | — | — | — | — |
| e-1 | Block polypropylene | 10 | 10 | 5 | — | 25 | 10 | 10 |
| e-2 | Random polypropylene | — | — | — | — | — | — | — |
| f | Maleic acid-modified LLDPE | 5 | — | — | 5 | 5 | — | — |

TABLE 2-continued

|  |  | Example | | | | | | |
|---|---|---|---|---|---|---|---|---|
|  |  | 8 | 9 | 10 | 11 | 12 | 13 | 14 |
| g |  | Organic peroxide | 0.2 | 0.2 | 0.2 | 0.2 | 0.2 | 0.2 | 0.2 |
| h | Crosslinking aid | 0.6 | 0.6 | 0.6 | 0.6 | 0.6 | 0.6 | 0.6 |
| B-1 | Kisma 5LH | 250 | 250 | 250 | 200 | 280 | 180 | 70 |
| B-2 | Kisma 5B | — | — | — | — | — | — | — |
| B-3 | Kisma 5 | — | — | — | — | — | — | — |
|  | Melamine cyanurate | — | — | — | — | — | — | — |
|  | TSL8370 | — | — | — | — | — | — | — |
|  | Antioxidant | 1 | 1 | 1 | 1 | 1 | 1 | 1 |
|  | Lubricant | 2 | 2 | 2 | 2 | 2 | 2 | 2 |
| Properties of the sheet | Extension (%) | 150 | 130 | 140 | 170 | 100 | 180 | 260 |
|  | Tensile strength (MPa) | 15 | 12 | 12 | 13 | 11 | 14 | 12 |
|  | Heat deformation 121° C. | 13 | 13 | 14 | 13 | 11 | 14 | 16 |
| Characteristics of the electric wire | Extension (%) | 150 | 130 | 150 | 180 | 100 | 180 | 280 |
|  | Tensile strength (MPa) | 14 | 13 | 12 | 14 | 11 | 13 | 13 |
|  | Horizontal flame test | 10/10 | 10/10 | 10/10 | 10/10 | 10/10 | 10/10 | 10/10 |
|  | Vertical flame test | 10/10 | 0/10 | 10/10 | 0/10 | 10/10 | 10/10 | 0/10 |
|  | Abrasion resistance | ◯ | ◯ | ◯ | Δ | Δ | ◯ | ◯ |
|  | Whitening | ◯ | ◯ | ◯ | ◯ | Δ | ◯ | ◯ |
|  | Heat deformation (%) | 21 | 20 | 24 | 23 | 17 | 24 | 32 |
|  | Extrudability | Δ | Δ | ◯ | ◯ | ◯ | ◯ | ◯ |

TABLE 3

|  |  | Example | | | | | | |
|---|---|---|---|---|---|---|---|---|
|  |  | 15 | 16 | 17 | 18 | 19 | 20 | 21 |
| a | SEPS | 30 | 30 | 30 | 15 | 15 | 15 | 15 |
| b | Paraffin oil | 15 | 15 | 20 | 5 | 5 | 5 | 5 |
| c-1 | Ethylene/α-olefin copolymer (0.870) | — | 35 | — | — | — | — | — |
| c-2 | Ethylene/α-olefin copolymer (0.915) | — | — | — | — | — | — | — |
| d-1 | Ethylene/vinyl acetate copolymer (VA = 33 wt %) | 10 | 10 | — | 50 | 50 | 50 | 50 |
| d-2 | Ethylene/vinyl acetate copolymer (VA = 41 wt %) | — | — | 15 | — | — | — | — |
| d-3 | Ethylene/vinyl acetate copolymer (VA = 28 wt %) | — | — | — | — | — | — | — |
| d-4 | Ethylene/ethyl acrylate copolymer (EA = 25 wt %) | — | — | — | — | — | — | — |
| e-1 | Block polypropylene | — | — | — | 25 | 25 | 25 | 25 |
| e-2 | Random polypropylene | 45 | 5 | 30 | — | — | — | — |
| f | Maleic acid-modified LLDPE | — | 5 | 5 | 5 | 5 | 5 | 5 |
| g | Organic peroxide | 0.2 | 0.2 | 0.2 | 0.2 | 0.2 | 0.2 | 0.2 |
| h | Crosslinking aid | 0.6 | 0.6 | 0.6 | 0.6 | 0.6 | 0.6 | 0.6 |
| B-1 | Kisma 5LH | 150 | 150 | 100 | 150 | — | — | 60 |
| B-2 | Kisma 5B | — | — | — | 100 | — | — | 40 |
| B-3 | Kisma 5 | — | — | — | — | 250 | 250 | — |
|  | Melamine cyanurate | — | — | — | — | — | — | — |
|  | TSL8370 | — | — | — | — | 2.5 | 2 | — |
|  | TSL8350 | — | — | — | — | — | 0.5 | — |
|  | Antioxidant | 1 | 1 | 1 | 1 | 1 | 1 | 1 |
|  | Lubricant | 2 | 2 | 2 | 2 | 2 | 2 | 2 |
| Properties of the sheet | Extension (%) | 220 | 200 | 260 | 170 | 140 | 120 | 290 |
|  | Tensile strength (MPa) | 12 | 19 | 12 | 11 | 13 | 14 | 10 |
|  | Heat deformation 121° C. | 7 | 13 | 8 | 14 | 12 | 12 | 15 |
| Characteristics of the electric wire | Extension (%) | 240 | 230 | Passed molding standard | 160 | 150 | 110 | 280 |
|  | Tensile strength (MPa) | 12 | 18 |  | 11 | 12 | 12 | 11 |
|  | Horizontal flame test | 10/10 | 10/10 |  | 10/10 | 10/10 | 10/10 | 10/10 |
|  | Vertical flame test | 0/10 | 0/10 |  | 10/10 | 10/10 | 10/10 | 0/10 |
|  | Abrasion resistance | ◯ | ◯ |  | ◯ | ◯ | ◯ | Δ |
|  | Whitening | Δ | ◯ |  | ◯ | ◯ | ◯ | ◯ |
|  | Heat deformation (%) | 16 | 23 |  | 22 | 21 | 21 | 32 |
|  | Extrudability | ◯ | ◯ | ◯ | ◯ | ◯ | ◯ | ◯ |

TABLE 4

|   |   | Example | | | |
|---|---|---|---|---|---|
|   |   | 22 | 23 | 24 | 25 |
| a | SEPS | 10 | 10 | 15 | 15 |
| b | Paraffin oil | 5 | 5 | 5 | 5 |
| c-1 | Ethylene/α-olefin copolymer (0.870) | — | — | — | — |
| c-2 | Ethylene/α-olefin copolymer (0.915) | — | — | — | — |
| d-1 | Ethylene/vinyl acetate copolymer (VA = 33 wt %) | — | — | 50 | 50 |
| d-2 | Ethylene/vinyl acetate copolymer (VA = 41 wt %) | — | — | — | — |
| d-3 | Ethylene/vinyl acetate copolymer (VA = 28 wt %) | 65 | — | — | — |
| d-4 | Ethylene/ethyl acrylate copolymer (EA = 25 wt %) | — | 70 | — | — |
| e-1 | Block polypropylene | 15 | 10 | 25 | 25 |
| e-2 | Random polypropylene | — | — | — | — |
| f | Maleic acid-modified LLDPE | 5 | 5 | 5 | 5 |

TABLE 4-continued

|   |   | Example | | | |
|---|---|---|---|---|---|
|   |   | 22 | 23 | 24 | 25 |
| g | Organic peroxide | 0.2 | 0.2 | 0.1 | 0.6 |
| h | Crosslinking aid | 0.6 | 0.6 | 0.2 | 1.2 |
| B-1 | Kisma 5LH | 250 | 250 | 250 | 250 |
| B-2 | Kisma 5B | — | — | — | — |
| B-3 | Kisma 5 | — | — | — | — |
|   | Melamine cyanurate | — | — | — | — |
|   | TSL8370 | — | — | — | — |
|   | Antioxidant | — | — | 1 | 1 |
|   | Lubricant | — | — | 2 | 2 |
| Properties of the sheet | Extension (%) | 160 | 140 | 200 | 110 |
|   | Tensile strength (MPa) | 15 | 12 | 10 | 12 |
|   | Heat deformation 121° C. | 12 | 12 | 18 | 8 |
| Characteristics of the electric wire | Extension (%) | 170 | 150 | 200 | 100 |
|   | Tensile strength (MPa) | 14 | 12 | 10 | 13 |
|   | Horizontal flame test | 10/10 | 10/10 | 10/10 | 10/10 |
|   | Vertical flame test | 10/10 | 10/10 | 10/10 | 10/10 |
|   | Abrasion resistance | ○ | ○ | Δ | ○ |
|   | Whitening | ○ | ○ | ○ | ○ |
|   | Heat deformation (%) | 22 | 23 | 32 | 16 |
|   | Extrudability | ○ | ○ | ○ | Δ |

TABLE 5

|   |   | Example | | | | | | |
|---|---|---|---|---|---|---|---|---|
|   |   | 26 | 27 | 28 | 29 | 30 | 31 | 32 |
| a | SEPS | 32 | 32 | 32 | 10 | 40 | 35 | 32 |
| b | Paraffin oil | 20 | 20 | 20 | 10 | 20 | 35 | 20 |
| c-1 | Ethylene/α-olefin copolymer (0.870) | 20 | — | 30 | 30 | 16 | 12 | — |
| c-2 | Ethylene/α-olefin copolymer (0.915) | — | — | — | — | — | — | — |
| d-5 | EP07P | 10 | 30 | 5 | 21 | 8 | 7 | 10 |
| d-6 | EP11 | — | — | — | — | — | — | — |
| d-7 | EP57P | — | — | — | — | — | — | — |
| e-1 | Block polypropylene | 10 | 10 | 5 | 21 | 8 | 5 | 30 |
| f | Maleic acid-modified LLDPE | 8 | 8 | 8 | 8 | 8 | 6 | 8 |
| g | Organic peroxide | 0.1 | 0.1 | 0.1 | 0.1 | 0.1 | 0.1 | 0.1 |
| h | Crosslinking aid | 0.4 | 0.4 | 0.4 | 0.4 | 0.4 | 0.4 | 0.4 |
| B-1 | Kisma 5LH | 100 | 100 | 100 | 100 | 100 | 100 | 100 |
| B-2 | Kisma 5B | 50 | 50 | 50 | 50 | 50 | 50 | 50 |
| B-3 | Kisma 5 | — | — | — | — | — | — | — |
|   | Antioxidant | 1 | 1 | 1 | 1 | 1 | 1 | 1 |
|   | Lubricant | 2 | 2 | 2 | 2 | 2 | 2 | 2 |
| Properties of the sheet | Extension (%) | 430 | 440 | 450 | 190 | 470 | 370 | 350 |
|   | Tensile strength (MPa) | 12.0 | 10.8 | 11.2 | 11.5 | 11.8 | 10.3 | 10.6 |
|   | Heat deformation | 19 | 23 | 17 | 13 | 16 | 31 | 11 |
|   | Hardness (A) | 89 | 87 | ND | ND | ND | 86 | ND |
| Characteristics of the electric wire | Extension (%) | 470 | 400 | 480 | 370 | 490 | 380 | 360 |
|   | Tensile strength (MPa) | 13.5 | 12.0 | 11.5 | 15.2 | 12.0 | 10.5 | 15.7 |
|   | Abrasion resistance | ○ | ○ | ○ | ○ | ○ | ○ | ○ |
|   | Horizontal flame test | 5/5 | 5/5 | 5/5 | 5/5 | 5/5 | 5/5 | 5/5 |
|   | 60°-inclined test | 5/5 | 5/5 | 5/5 | 5/5 | 5/5 | 5/5 | 5/5 |
|   | Rate of heat deformation (%) | 32 | 35 | 30 | 22 | 30 | 40 | 18 |

TABLE 5-continued

|  |  | Example | | | | | | |
|---|---|---|---|---|---|---|---|---|
|  |  | 26 | 27 | 28 | 29 | 30 | 31 | 32 |
|  | Whitening | ○ | ○ | ○ | ○ | ○ | ○ | Δ |
|  | Outer appearance | ○ | ○ | ○ | ○ | ○ | ○ | ○ |
|  | Extrudability | ○ | ○ | Δ | ○ | Δ | ○ | ○ |

(Note)
ND: Not determined

TABLE 6

|  |  | Example | | | | | | | |
|---|---|---|---|---|---|---|---|---|---|
|  |  | 33 | 34 | 35 | 36 | 37 | 38 | 39 | 40 |
| a | SEPS | 20 | 34 | 30 | 32 | 32 | 32 | 32 | 32 |
| b | Paraffin oil | 12 | 22 | 19 | 20 | 20 | 20 | 20 | 20 |
| c-1 | Ethylene/α-olefin copolymer (0.870) | 5 | 20 | 18 | 20 | 20 | 20 | 20 | 20 |
| c-2 | Ethylene/α-olefin copolymer (0.915) | — | — | — | — | — | — | — | — |
| d-5 | EP07P | 50 | 12 | 10 | 10 | 10 | 10 | 10 | 10 |
| d-6 | EP11 | — | — | — | — | — | — | — | — |
| d-7 | EP57P | — | — | — | — | — | — | — | — |
| e-1 | Block polypropylene | 5 | 12 | 8 | 10 | 10 | 10 | 10 | 10 |
| f | Maleic acid-modified LLDPE | 8 | 0 | 15 | 8 | 8 | 8 | 8 | 8 |
| g | Organic peroxide | 0.1 | 0.1 | 0.1 | 0.1 | 0.1 | 0.1 | 0.1 | 0.1 |
| h | Crosslinking aid | 0.4 | 0.4 | 0.4 | 0.4 | 0.4 | 0.4 | 0.4 | 0.4 |
| B-1 | Kisma 5LH | 100 | 100 | 100 | 70 | 280 | 30 | 50 | 100 |
| B-2 | Kisma 5B | 50 | 50 | 50 | — | — | 70 | 100 | — |
| B-3 | Kisma 5 | — | — | — | — | — | — | — | 50 |
|  | Antioxidant | 1 | 1 | 1 | 1 | 1 | 1 | 1 | 1 |
|  | Lubricant | 2 | 2 | 2 | 2 | 2 | 2 | 2 | 2 |
| Properties of the sheet | Extension (%) | 410 | 445 | 220 | 480 | 120 | 570 | 540 | 430 |
|  | Tensile strength (MPa) | 10.3 | 10.5 | 13.9 | 18.1 | 10.4 | 12.3 | 11.2 | 11.8 |
|  | Heat deformation | 32 | 19 | 19 | 27 | 14 | 24 | 20 | 20 |
|  | Hardness (A) | ND | 88 | ND | 83 | 94 | ND | ND | ND |
| Characteristics of the electric wire | Extension (%) | 480 | 480 | 250 | 550 | 140 | 580 | 490 | 470 |
|  | Tensile strength (MPa) | 10.8 | 10.5 | 13.5 | 15.1 | 10.1 | 15.8 | 10.2 | 12.2 |
|  | Abrasion resistance | ○ | ○ | ○ | ○ | ○ | ○ | ○ | ○ |
|  | Horizontal flame test | 5/5 | 5/5 | 5/5 | 5/5 | 5/5 | 5/5 | 5/5 | 5/5 |
|  | 60°-inclined test | 5/5 | 5/5 | 5/5 | 0/5 | 5/5 | 0/5 | 5/5 | 5/5 |
|  | Rate of heat deformation (%) | 40 | 33 | 33 | 37 | 24 | 36 | 32 | 32 |
|  | Whitening | ○ | ○ | ○ | ○ | ○ | ○ | ○ | ○ |
|  | Outer appearance | ○ | ○ | ○ | ○ | ○ | ○ | ○ | ○ |
|  | Extrudability | Δ | ○ | Δ | ○ | Δ | ○ | ○ | ○ |

TABLE 7

|  |  | Example | | | | | |
|---|---|---|---|---|---|---|---|
|  |  | 41 | 42 | 43 | 44 | 45 | 46 |
| a | SEPS | 32 | 32 | 32 | 32 | 30 | 35 |
| b | Paraffin oil | 20 | 20 | 20 | 20 | 15 | 27 |
| c-1 | Ethylene/α-olefin copolymer (0.870) | 20 | 20 | — | 20 | — | 22 |
| c-2 | Ethylene/α-olefin copolymer (0.915) | — | — | 20 | — | — | — |
| d-1 | Ethylene/vinyl acetate copolymer (VA = 33 wt %) | — | — | — | — | 30 | — |
| d-5 | EP07P | 10 | 10 | 10 | — | 10 | 10 |
| d-6 | EP11 | — | — | — | 10 | — | — |
| d-7 | EP57P | — | — | — | — | — | — |
| e-1 | Block polypropylene | 10 | 10 | 10 | 10 | — | — |
| e-2 | Random polypropylene | — | — | — | — | 10 | — |
| f | Maleic acid-modified LLDPE | 8 | 8 | 8 | 8 | 5 | 6 |
| g | Organic peroxide | 0.05 | 0.6 | 0.1 | 0.1 | 0.2 | 0.1 |
| h | Crosslinking aid | 0.2 | 1.2 | 0.4 | 0.4 | 0.6 | 0.4 |
| B-1 | Kisma 5LH | 100 | 100 | 100 | 100 | 150 | 150 |

TABLE 7-continued

|  |  | Example ||||||
|---|---|---|---|---|---|---|---|
|  |  | 41 | 42 | 43 | 44 | 45 | 46 |
| B-2 | Kisma 5B | 50 | 50 | 50 | 50 | — | — |
| B-3 | Kisma 5 | — | — | — | — | — | — |
|  | Antioxidant | 1 | 1 | 1 | 1 | 1 | 1 |
|  | Lubricant | 2 | 2 | 2 | 2 | 2 | 2 |
| Properties | Extension (%) | 520 | 160 | 410 | 240 | 240 | 380 |
| of the sheet | Tensile strength (MPa) | 10.7 | 14.0 | 13.4 | 10.9 | 13.0 | 11.0 |
|  | Heat deformation | 31 | 10 | 20 | 19 | 12 | 24 |
|  | Hardness (A) | ND | ND | ND | ND | ND | 84 |
| Characteristics | Extension (%) | 550 | 280 | 450 | 280 | 260 | 400 |
| of the electric | Tensile strength (MPa) | 10.9 | 14.3 | 14.0 | 13.5 | 13 | 11.1 |
| wire | Abrasion resistance | ○ | ○ | ○ | ○ | ○ | ○ |
|  | Horizontal flame test | 5/5 | 5/5 | 5/5 | 5/5 | 10/10 | 5/5 |
|  | 60°-inclined test | 5/5 | 5/5 | 5/5 | 5/5 | ND | 5/5 |
|  | Vertical flame test | ND | ND | ND | ND | 0/10 | ND |
|  | Rate of heat deformation (%) | 40 | 18 | 32 | 31 | 21 | 38 |
|  | Whitening | ○ | ○ | ○ | ○ | ○ | ○ |
|  | Outer appearance | ○ | ○ | ○ | ○ | ○ | ○ |
|  | Extrudability | ○ | Δ | ○ | ○ | ○ | ○ |

TABLE 8

|  |  | Comparative example |||||||
|---|---|---|---|---|---|---|---|---|
|  |  | 1 | 2 | 3 | 4 | 5 | 6 | 7 |
| a | SEPS | 2 | 65 | 20 | 20 | 5 | 15 | 15 |
| b | Paraffin oil | 8 | 10 | 50 | 10 | 5 | 5 | 5 |
| c-1 | Ethylene/α-olefin copolymer (0.870) | — | — | — | — | — | — | — |
| c-2 | Ethylene/α-olefin copolymer (0.915) | — | — | — | — | — | — | — |
| d-1 | Ethylene/vinyl acetate copolymer (VA = 33 wt %) | 65 | 15 | 20 | 10 | 90 | 40 | 50 |
| d-2 | Ethylene/vinyl acetate copolymer (VA = 41 wt %) | — | — | — | — | — | — | — |
| d-3 | Ethylene/vinyl acetate copolymer (VA = 28 wt %) | — | — | — | — | — | — | — |
| d-4 | Ethylene/ethyl acrylate copolymer (EA = 25 wt %) | — | — | — | — | — | — | — |
| e-1 | Block polypropylene | — | — | — | — | — | — | 25 |
| e-2 | Random polypropylene | 20 | 5 | 5 | 60 | — | — | — |
| f | Maleic acid-modified LLDPE | 5 | 5 | 5 | — | — | 40 | 5 |
| g | Organic peroxide | 0.2 | 0.2 | 0.2 | 0.2 | 0.2 | 0.2 | 0.2 |
| h | Crosslinking aid | 0.6 | 0.6 | 0.6 | 0.6 | 0.6 | 0.6 | 0.6 |
| B-1 | Kisma 5LH | 200 | 200 | 200 | 150 | 200 | 180 | 350 |
| B-2 | Kisma 5B | — | — | — | — | — | — | — |
| B-3 | Kisma 5 | — | — | — | — | — | — | — |
|  | Melamine cyanurate | — | — | — | — | — | — | — |
|  | TSL8370 | — | — | — | — | — | — | — |
|  | Antioxidant | 1 | 1 | 1 | 1 | 1 | 1 | 1 |
|  | Lubricant | 2 | 2 | 2 | 2 | 2 | 2 | 2 |
| Properties | Extension (%) | 80 | 160 | 260 | 240 | Molding was impossible | 150 | 60 |
| of the sheet | Tensile strength (MPa) | 12 | 18 | 6 | 13 |  | 19 | 12 |
|  | Heat deformation 121° C. | 13 | 12 | 19 | 5 |  | 13 | 12 |
| Characteristics | Extension (%) | Extrusion was impossible Outer appearance was not shown at all | Extrusion was impossible due to large extrusion load | 290 | 240 |  | Extrusion was impossible due to large extrusion load | 60 |
| of the electric | Tensile strength (MPa) |  |  | 6 | 15 |  |  | 12 |
| wire | Horizontal flame test |  |  | 10/10 | 10/10 |  |  | 10/10 |
|  | Vertical flame test |  |  | 0/10 | 0/10 |  |  | 10/10 |
|  | Abrasion resistance |  |  | X | X |  |  | X |
|  | Whitening |  |  | ○ | X |  |  | Δ |
|  | Heat deformation (%) |  |  | 32 | 12 |  |  | 21 |
|  | Extrudability | X | X | X Oil was bled | ○ | X | X | Δ |

TABLE 9

|   |   | Comparative example | | | | | | |
|---|---|---|---|---|---|---|---|---|
|   |   | 8 | 9 | 10 | 11 | 12 | 13 | 14 |
| a | SEPS | 15 | 15 | 15 | 15 | 15 | 15 | 15 |
| b | Paraffin oil | 5 | 5 | 5 | 5 | 5 | 5 | 5 |
| c-1 | Ethylene/α-olefin copolymer (0.870) | — | — | — | — | — | — | — |
| c-2 | Ethylene/α-olefin copolymer (0.915) | — | — | — | — | — | — | — |
| d-1 | Ethylene/vinyl acetate copolymer (VA = 33 wt %) | 50 | 50 | 50 | 50 | 50 | 50 | 50 |
| d-2 | Ethylene/vinyl acetate copolymer (VA = 41 wt %) | — | — | — | — | — | — | — |
| d-3 | Ethylene/vinyl acetate copolymer (VA = 28 wt %) | — | — | — | — | — | — | — |
| d-4 | Ethylene/ethyl acrylate copolymer (EA = 25 wt %) | — | — | — | — | — | — | — |
| e-1 | Block polypropylene | 25 | 25 | 25 | 25 | 25 | 25 | 25 |
| e-2 | Random polypropylene | — | — | — | — | — | — | — |
| f | Maleic acid-modified LLDPE | 5 | 5 | 5 | 5 | 5 | 5 | 5 |
| g | Organic peroxide | 0.2 | 0.2 | 0.2 | 0.2 | 0.2 | 0.2 | 1.2 |
| h | Crosslinking aid | 0.6 | 0.6 | 0.6 | 0.6 | 0.6 | 0.6 | 2 |
| B-1 | Kisma 5LH | 40 | — | 100 | 40 | — | 150 | 250 |
| B-2 | Kisma 5B | — | 250 | 150 | 40 | — | — | — |
| B-3 | Kisma 5 | — | — | — | — | 250 | — | — |
|   | Melamine cyanurate | — | — | — | — | — | — | — |
|   | TSL8370 | — | — | — | — | 2.5 | — | — |
|   | Antioxidant | 2 | 2 | — | — | — | — | 1 |
|   | Lubricant | 1 | 1 | — | — | — | — | 2 |
| Properties of the sheet | Extension (%) | 200 | 230 | 260 | 290 | Molding was impossible | 180 | Uniformly kneaded material was not obtained |
|   | Tensile strength (MPa) | 12 | 6 | 9 | 9 | | 7 | |
|   | Heat deformation 121° C. | 18 | 11 | 12 | 17 | | 12 | |
| Characteristics of the electric wire | Extension (%) | 220 | 220 | 250 | 270 | | 160 | |
|   | Tensile strength (MPa) | 13 | 5 | 8 | 9 | | 6 | |
|   | Horizontal flame test | 0/10 | 10/10 | 10/10 | 10/10 | | 10/10 | |
|   | Vertical flame test | 0/10 | 10/10 | 10/10 | 0/10 | | 0/10 | |
|   | Abrasion resistance | Δ | X | X | Δ | | X | |
|   | Whitening | ○ | Δ | Δ | ○ | | Δ | |
|   | Heat deformation (%) | 31 | 22 | 23 | 29 | | 22 | |
|   | Extrudability | ○ | ○ | ○ | ○ | X | Δ | |

TABLE 10

|   |   | Comparative example | | | | | |
|---|---|---|---|---|---|---|---|
|   |   | 15 | 16 | 17 | 18 | 19 | 20 |
| a | SEPS | 5 | 50 | 35 | 22 | 17 | 20 |
| b | Paraffin oil | 5 | 10 | 45 | 20 | 10 | 12 |
| c-1 | Ethylene/α-olefin copolymer (0.870) | 50 | 10 | — | 10 | 50 | — |
| c-2 | Ethylene/α-olefin copolymer (0.915) | — | — | — | — | — | — |
| d-5 | EP07P | 21 | 16 | 6 | 5 | 10 | 55 |
| d-6 | EP11 | — | — | — | — | — | — |
| d-7 | EP57P | — | — | — | — | — | — |
| e-1 | Block polypropylene | 11 | 6 | 6 | 35 | 5 | 5 |
| f | Maleic acid-modified LLDPE | 8 | 8 | 8 | 8 | 8 | 8 |
| g | Organic peroxide | 0.1 | 0.1 | 0.1 | 0.1 | 0.1 | 0.1 |
| h | Crosslinking aid | 0.4 | 0.4 | 0.4 | 0.4 | 0.4 | 0.4 |
| B-1 | Kisma 5LH | 100 | 100 | 100 | 100 | 100 | 100 |
| B-2 | Kisma 5B | 50 | 50 | 50 | 50 | 50 | 50 |
| B-3 | Kisma 5 | — | — | — | — | — | — |
|   | Antioxidant | 1 | 1 | 1 | 1 | 1 | 1 |
|   | Lubricant | 2 | 2 | 2 | 2 | 2 | 2 |
| Properties of the sheet | Extension (%) | 170 | 380 | 440 | 360 | 160 | 500 |
|   | Tensile strength (MPa) | 9.6 | 11.0 | 8.0 | 8.2 | 13.4 | 7.7 |
|   | Heat deformation | 52 | 14 | 34 | 9 | 29 | 58 |
|   | Hardness (A) | ND | ND | ND | 98 | ND | ND |

TABLE 10-continued

|  |  | Comparative example | | | | | |
|---|---|---|---|---|---|---|---|
|  |  | 15 | 16 | 17 | 18 | 19 | 20 |
| Characteristics of the electric wire | Extension (%) | Sample preparation was impossible | Sample preparation was impossible | 420 | 370 | Sample preparation was impossible | Sample preparation was impossible |
|  | Tensile strength (MPa) |  |  | 8.0 | 8.0 |  |  |
|  | Abrasion resistance |  |  | X | ○ |  |  |
|  | Horizontal flame test |  |  | 5/5 | 5/5 |  |  |
|  | 60°-inclined test |  |  | 5/5 | 0/5 |  |  |
|  | Rate of heat deformation (%) |  |  | 41 | 21 |  |  |
|  | Whitening |  |  | ○ | X |  |  |
|  | Outer appearance |  |  | X Bleeding occurred | X |  |  |
|  | Extrudability | X | X | ○ | ○ | X | X |

TABLE 11

|  |  | Comparative example | | | | | | | |
|---|---|---|---|---|---|---|---|---|---|
|  |  | 21 | 22 | 23 | 24 | 25 | 26 | 27 | 28 |
| a | SEPS | 30 | 32 | 32 | 32 | 32 | 32 | 32 | 32 |
| b | Paraffin oil | 18 | 20 | 20 | 20 | 20 | 20 | 20 | 20 |
| c-1 | Ethylene/α-olefin copolymer (0.870) | 16 | 20 | 20 | 20 | 20 | 20 | 20 | 20 |
| c-2 | Ethylene/α-olefin copolymer (0.915) | — | — | — | — | — | — | — | — |
| d-5 | EP07P | 8 | 10 | 10 | 10 | 10 | 10 | 10 | — |
| d-6 | EP11 | — | — | — | — | — | — | — | — |
| d-7 | EP57P | — | — | — | — | — | — | — | 10 |
| e-1 | Block polypropylene | 8 | 10 | 10 | 10 | 10 | 10 | 10 | 10 |
| f | Maleic acid-modified LLDPE | 20 | 8 | 8 | 8 | 8 | 8 | 8 | 8 |
| g | Organic peroxide | 0.1 | 0 | 1.2 | 0.1 | 0.1 | 0.1 | 0.1 | 0.1 |
| h | Crosslinking aid | 0.4 | 0.1 | 1.8 | 0.4 | 0.4 | 0.4 | 0.4 | 0.4 |
| B-1 | Kisma 5LH | 100 | 100 | 100 | 40 | 350 | 20 | 35 | 100 |
| B-2 | Kisma 5B | 50 | 50 | 50 | — | — | 80 | 115 | 50 |
| B-3 | Kisma 5 | — | — | — | — | — | — | — | — |
|  | Antioxidant | 1 | 1 | 1 | 1 | 1 | 1 | 1 | 1 |
|  | Lubricant | 2 | 2 | 2 | 2 | 2 | 2 | 2 | 2 |
| Properties of the sheet | Extension (%) | 80 | 580 | 40 | 490 | 50 | 580 | 640 | 120 |
|  | Tensile strength (MPa) | 17.5 | 6.1 | 7.0 | 17.5 | 9.0 | 9.4 | 7.9 | 15.2 |
|  | Heat deformation | 16 | 74 | 10 | 29 | 14 | 24 | 20 | 19 |
|  | Hardness (A) | 94 | ND | ND | ND | ND | ND | ND | 91 |
| Characteristics of the electric wire | Extension (%) | 50 | 580 | Sample preparation was impossible | 500 | 50 | 600 | 640 | Sample preparation was impossible |
|  | Tensile strength (MPa) | 18.9 | 7.2 |  | 17.7 | 11.0 | 9.6 | 8.3 |  |
|  | Abrasion resistance | ○ | ○ |  | ○ | X | X | X |  |
|  | Horizontal flame test | 5/5 | 5/5 |  | 0.5 | 5/5 | 5/5 | 5/5 |  |
|  | 60°-inclined test | 5/5 | 5/5 |  | 0/5 | 5/5 | 0.5 | 5/5 |  |
|  | Rate of heat deformation (%) | 25 | 82 |  | 39 | 22 | 58 | 38 |  |
|  | Whitening | ○ | ○ |  | ○ | X | X | ○ |  |
|  | Outer appearance | X | ○ |  | ○ | X | ○ | ○ |  |
|  | Extrudability | Δ | ○ | X | ○ | Δ | ○ | ○ | X |

As is apparent from the results shown in Tables 1 to 11, the fire-retardant resin compositions obtained in Examples 1 to 46, and the sheets, electric wires, optical fiber core wires, and optical fiber cords obtained using the same, had the required extension and the required tensile strength; they were good in the flame test, the abrasion resistance test, the whitening test, and the heat deformation rate, and they were excellent in extrudability and flexibility. In Example 17, a molded plug was obtained, wherein there was little shrinkage of the material after the molding, and the outer appearance was good. Further, it was confirmed that, when the power source plug section was exposed to the flame of a burner used in the fire retardancy test stipulated in JIS C 3005 for 15 sec, and then the flame was withdrawn, immediately the burning died out.

In contrast, in Comparative Examples 1 to 28, uniform kneading or extrusion was impossible, or there was a problem related to any of extension, tensile strength, whitening, extrudability, flexibility, hardness, fire retardancy, abrasion resistance, and heat deformation properties, and no electric wire good in all the properties was obtained. In this connection, the compound of Comparative Example 12, wherein pretreatment with a silane coupling agent was not effected, and after the addition of magnesium hydroxide, a silane coupling agent and an organic peroxide were added, was difficult to be remolded, there were many granular structures on the surface of the sheet, and extrusion was impossible. Further, in Comparative Example 13, wherein, after the completion of the partial crosslinking reaction, a vinyl silane-treated magnesium hydroxide was added, the effect of improving mechanical properties of electric wires could not be obtained satisfactorily. It can be understood that the effect is not observed unless the metal hydrate is added before or at the same time with the partial crosslinking reaction.

Having described our invention as related to the present embodiments, it is our intention that the invention not be limited by any of the details of the description, unless otherwise specified, but rather be construed broadly within its spirit and scope as set out in the accompanying claims.

What we claim is:

1. A fire-retardant resin composition, which comprises:
    a thermoplastic resin component (A) comprising (a) 5 to 55% by weight of a block copolymer made up of at least two polymer blocks A mainly made of a vinyl aromatic compound as its constitutional component and at least one polymer block B mainly made of a conjugated diene compound as its constitutional component, and/or a hydrogenated block copolymer obtained by hydrogenating the block copolymer, (b) 0 to 4.0% by weight of a nonaromatic-series softening agent for rubber, (c) 0 to 40% by weight of an ethylene/α-olefin copolymer, (d1) 5 to 80% by weight of at least one copolymer of an ethylene/vinyl acetate copolymer, an ethylene/(meth)acrylic acid copolymer, or an ethylene/(meth)acrylate copolymer, (e) 0 to 50% by weight of a polypropylene resin, and (f) 0 to 30% by weight of a modified polyethylene resin being modified with an unsaturated carboxylic acid or a derivative thereof, and
    (g) 0.01 to 0.6 parts by weight of an organic peroxide, (h) 0.03 to 1.8 parts by weight of a (meth)acrylate-series and/or allyl-series crosslinking aid, and 50 to 300 parts by weight of a metal hydrate (B), respectively to 100 parts by weight of the thermoplastic resin component (A),
    wherein the metal hydrate (B) is such that (i) when the metal hydrate (B) is in an amount of 50 parts by weight or more but less than 100 parts by weight, 50 parts by weight or more of the metal hydrate (B) to 100 parts by weight of the thermoplastic resin component (A) is made up of a metal hydrate that is being pretreated with a silane coupling agent; or (ii) when the metal hydrate (B) is in an amount of 100 parts by weight or more but 300 parts by weight or less, at least half of the amount of the metal hydrate (B) is made up of a metal hydrate that is being pretreated with a silane coupling agent; and
    the fire-retardant resin composition is a mixture of the above formulation that is heated and kneaded at a temperature equal to or higher than the melting temperature of the thermoplastic resin component (A) resulting in a partially crosslinked thermoplastic fire retardant resin composition.

2. A fire-retardant resin composition, which comprises:
    a thermoplastic resin component (A) comprising (a) 10 to 30% by weight of a block copolymer made up of at least two polymer blocks A mainly made of a vinyl aromatic compound as its constitutional component and at least one polymer block B mainly made of a conjugated diene compound as its constitutional component, and/or a hydrogenated block copolymer obtained by hydrogenating the block copolymer, (b) 0 to 20% by weight of a nonaromatic-series softening agent for rubber, (c) 0 to 20% by weight of an ethylene/α-olefin copolymer, (d1) 35 to 80% by weight of at least one copolymer of an ethylene/vinyl acetate copolymer, an ethylene/(meth)acrylic acid copolymer, or an ethylene/(meth) acrylate copolymer, (e) 0 to 35% by weight of a polypropylene resin, and (f) 0 to 30% by weight of a modified polyethylene resin being modified with an unsaturated carboxylic acid or a derivative thereof, and
    (g) 0.01 to 0.6 parts by weight of an organic peroxide, (h) 0.03 to 1.8 parts by weight of a (meth)acrylate-series and/or allyl-series crosslinking aid, and 50 to 300 parts by weight of a metal hydrate (B), respectively to 100 parts by weight of the thermoplastic resin component (A),
    wherein the metal hydrate (B) is such that (i) when the metal hydrate (B) is in an amount of 50 parts by weight or more but less than 100 parts by weight, 50 parts by weight or more of the metal hydrate (B) to 100 parts by weight of the thermoplastic resin component (A) is made up of a metal hydrate that is being pretreated with a silane coupling agent; or (ii) when the metal hydrate (B) is in an amount of 100 parts by weight or more but 300 parts by weight or less, at least half of the amount of the metal hydrate (B) is made up of a metal hydrate that is being pretreated with a silane coupling agent; and
    the fire-retardant resin composition is a mixture of the above formulation that is heated and kneaded at a temperature equal to or higher than the melting temperature of the thermoplastic resin component (A) resulting in a partially crosslinked thermoplastic fire retardant resin composition.

3. A fire-retardant resin composition, which comprises:
    a thermoplastic resin component (A) comprising (a) 10 to 40% by weight of a block copolymer made up of at least two polymer blocks A mainly made of a vinyl aromatic compound as its constitutional component and at least one polymer block B mainly made of a conjugated diene compound as its constitutional component, and/or a hydrogenated block copolymer obtained by hydrogenating the block copolymer, (b) 10 to 40% by weight of a nonaromatic-series softening agent for rubber, (c) 0 to 40% by weight of an ethylene/α-olefin copolymer, (d2) 5 to 50% by weight of an ethylene/propylene copolymer rubber, (e) 0 to 30% by weight of a polypropylene resin, and (f) 0 to 15% by weight of a modified polyethylene resin being modified with an unsaturated carboxylic acid or a derivative thereof, and
    (g) 0.01 to 0.6 parts by weight of an organic peroxide, (h) 0.03 to 1.8 parts by weight of a (meth)acrylate-series and/or allyl-series crosslinking aid, and 50 to 300 parts by weight of a metal hydrate (B), respectively to 100 parts by weight of the thermoplastic resin component (A),
    wherein the metal hydrate (B) is such that (i) when the metal hydrate (B) is in an amount of 50 parts by weight or more but less than 100 parts by weight, 25 parts by weight or more of the metal hydrate (B) to 100 parts by weight of the thermoplastic resin component (A) is made up of a metal hydrate that is being pretreated with a silane coupling agent; or (ii) when the metal hydrate (B) is in an amount of 100 parts by weight or more but 300 parts by weight or less, at least quarter of the amount of the metal hydrate (B) is made up of a metal hydrate that is being pretreated with a silane coupling agent; and
    the fire-retardant resin composition is a mixture of the above formulation that is heated and kneaded at a temperature equal to or higher than the melting temperature of the thermoplastic resin component (A) resulting in a partially crosslinked thermoplastic fire retardant resin composition.

4. A fire-retardant resin composition, which comprises:
a thermoplastic resin component (A) comprising (a) 5 to 55% by weight of a block copolymer made up of at least two polymer blocks A mainly made of a vinyl aromatic compound as its constitutional component and at least one polymer block B mainly made of a conjugated diene compound as its constitutional component, and/or a hydrogenated block copolymer obtained by hydrogenating the block copolymer, (b) 5 to 40% by weight of a nonaromatic-series softening agent for rubber, (c) 0 to 40% by weight of an ethylene/α-olefin copolymer, (d1) 5 to 80% by weight of at least one copolymer of an ethylene/vinyl acetate copolymer, an ethylene/(meth)acrylic acid copolymer, or an ethylene/(meth)acrylate copolymer, (d2) 5 to 50% by weight of an ethylene/propylene copolymer rubber, (e) 0 to 50% by weight of a polypropylene resin, and (f) 0 to 30% by weight of a modified polyethylene resin being modified with an unsaturated carboxylic acid or a derivative thereof, and
(g) 0.01 to 0.6 parts by weight of an organic peroxide, (h) 0.03 to 1.8 parts by weight of a (meth)acrylate-series and/or allyl-series crosslinking aid, and 50 to 300 parts by weight of a metal hydrate (B), respectively to 100 parts by weight of the thermoplastic resin component (A),
wherein the metal hydrate (B) is such that (i) when the metal hydrate (B) is in an amount of 50 parts by weight or more but less than 100 parts by weight, 50 parts by weight or more of the metal hydrate (B) to 100 parts by weight of the thermoplastic resin component (A) is made up of a metal hydrate that is being pretreated with a silane coupling agent; or (ii) when the metal hydrate (B) is in an amount of 100 parts by weight or more but 300 parts by weight or less, at least half of the amount of the metal hydrate (B) is made up of a metal hydrate that is being pretreated with a silane coupling agent; and the fire-retardant resin composition is a mixture of the above formulation that is heated and kneaded at a temperature equal to or higher than the melting temperature of the thermoplastic resin component (A) resulting in a partially crosslinked thermoplastic fire retardant resin composition.

5. The fire-retardant resin composition as claimed in claim 1, wherein the crosslinking aid (h) is a (meth)acrylate-series crosslinking aid represented by the formula:

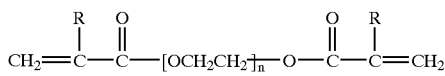

wherein R represents H or CH$_3$, and n is an integer of 1 to 9.

6. The fire-retardant resin composition as claimed in claim 1, wherein the metal hydrate (B) is magnesium hydroxide.

7. The fire-retardant resin composition as claimed in claim 1, wherein the silane coupling agent is a silane compound having a vinyl group and/or an epoxy group at its terminal.

8. The fire-retardant resin composition as claimed in claim 1, wherein the at least one copolymer of an ethylene/vinyl acetate copolymer, an ethylene/(meth)acrylic acid copolymer, or an ethylene/(meth)acrylate copolymer (d1) is an ethylene/vinyl acetate copolymer having a vinyl acetate component content of 25% by weight or more.

9. The fire-retardant resin composition as claimed in claim 1, further containing melamine cyanurate in an amount of 3 to 70 parts by weight, to 100 parts by weight of the thermoplastic resin component (A).

10. The fire-retardant resin composition as claimed in claim 1, further containing at least one selected from zinc borate, zinc stannate, and zinc hydroxystannate in an amount of 0.5 to 20 parts by weight, to 100 parts by weight of the thermoplastic resin component (A).

11. A molded article, which has a covering layer of the fire-retardant resin composition as claimed in claim 1, on the outside of a conductor, or an optical fiber element wire or/and an optical fiber core wire.

12. A molded part, which is obtained by molding the fire-retardant resin composition as claimed in claim 1.

13. A method for preparing a fire-retardant resin composition that is the fire-retardant resin composition as claimed in claim 1, which comprises:

heating and kneading, simultaneously, at the temperature equal to or higher than the melting temperature of the resin ingredients (a) to (f), (a) the block copolymer made up of at least two polymer blocks A mainly made of a vinyl aromatic compound as its constitutional component and at least one polymer block B mainly made of a conjugated diene compound as its constitutional component, and/or the hydrogenated block copolymer obtained by hydrogenating the block copolymer, (b) the nonaromatic-series softening agent for rubber, (c) the ethylene/α-olefin copolymer, (d1) the at least one copolymer of an ethylene/vinyl acetate copolymer, an ethylene/(meth)acrylic acid copolymer, or an ethylene/(meth)acrylate copolymer and/or (d2) the ethylene/propylene copolymer rubber, (e) the polypropylene resin, (f) the modified polyethylene resin being modified with an unsaturated carboxylic acid or a derivative thereof, (g) the organic peroxide, (h) the (meth)acrylate-series and/or allyl-series crosslinking aid, and the metal hydrate (B), to carry out crosslinking.

14. A method for preparing a fire-retardant resin composition that is the fire-retardant resin composition as claimed in claim 1, which comprises:

a first step of heating and kneading (a) the block copolymer made up of at least two polymer blocks A mainly made of a vinyl aromatic compound as its constitutional component and at least one polymer block B mainly made of a conjugated diene compound as its constitutional component, and/or the hydrogenated block copolymer obtained by hydrogenating the block copolymer, (b) the nonaromatic-series softening agent for rubber, (c) the ethylene/α-olefin copolymer, (d1) the at least one copolymer of an ethylene/vinyl acetate copolymer, an ethylene/(meth)acrylic acid copolymer, or an ethylene/(meth)acrylate copolymer and/or (d2) the ethylene/propylene copolymer rubber, (e) the polypropylene resin, and (f) the modified polyethylene resin being modified with an unsaturated carboxylic acid or a derivative thereof, to obtain the thermoplastic resin component (A), and a second step of heating and kneading, at the temperature equal to or higher than the melting temperature of the thermoplastic resin component (A), the resultant resin component (A), (g) the organic peroxide, (h) the (meth)acrylate-series and/or allyl-series crosslinking aid, and the metal hydrate (B), to carry out crosslinking.

15. The fire-retardant resin composition as claimed in claim 2, wherein the crosslinking aid (h) is a (meth)acrylate-series crosslinking aid represented by the formula:

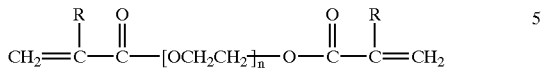

wherein R represents H or CH$_3$, and n is an integer of 1 to 9.

16. The fire-retardant resin composition as claimed in claim 2, wherein the metal hydrate (B) is magnesium hydroxide.

17. The fire-retardant resin composition as claimed in claim 2, wherein the silane coupling agent is a silane compound having a vinyl group and/or an epoxy group at its terminal.

18. The fire-retardant resin composition as claimed in claim 2, wherein the at least one copolymer of an ethylene/vinyl acetate copolymer, an ethylene/(meth)acrylic acid copolymer, or an ethylene/(meth)acrylate copolymer (d1) is an ethylene/vinyl acetate copolymer having a vinyl acetate component content of 25% by weight or more.

19. The fire-retardant resin composition as claimed in claim 2, further containing melamine cyanurate in an amount of 3 to 70 parts by weight, to 100 parts by weight of the thermoplastic resin component (A).

20. The fire-retardant resin composition as claimed in claim 2, further containing at least on selected from the group consisting of zinc borate, zinc stannate and zinc hydroxystannate in an amount of 0.5 to 20 parts by weight, to 100 parts by weight of the thermoplastic resin component (A).

21. A molded article, which has a covering layer of the fire-retardant resin composition as claimed in claim 2, on the outside of a conductor, or an optical fiber element wire and/or an optical fiber core wire.

22. A molded part, which is obtained by molding the fire-retardant resin composition as claimed in claim 2.

23. A method for preparing a fire-retardant resin composition that is the fire retardant resin composition claimed in claim 2, which comprises:
heating and kneading, simultaneously, at a temperature equal to or higher than the melting temperature of the resin ingredients (a) to (f), (a) the block copolymer made up of at least two polymer blocks A mainly made of a vinyl aromatic compound as its constitutional component and at least one polymer block B mainly made of a conjugated diene compound as its constitutional component, and/or the hydrogenated block copolymer obtained by hydrogenating the block copolymer, (b) the nonaromatic-series softening agent for rubber, (c) the ethylene/α-olefin copolymer, (d1) the at least one copolymer of an ethylene/vinyl acetate copolymer, an ethylene/(meth)acrylic acid copolymer, or an ethylene/(meth)acrylate copolymer and/or (d2) the ethylene/propylene copolymer rubber, (e) the polypropylene resin, (f) the modified polyethylene resin being modified with an unsaturated carboxylic acid or a derivative thereof, (g) the organic peroxide, (h) the (meth)acrylate-series and/or allyl-series crosslinking aid, and the metal hydrate (B), to carry out crosslinking.

24. A method for preparing a fire-retardant resin composition that is the fire retardant resin composition claimed in claim 2, which comprises:
a first step of heating and kneading (a) the block copolymer made up of at least two polymer blocks A mainly made of a vinyl aromatic compound as its constitutional component and at least one polymer block B mainly made of a conjugated diene compound as its constitutional component, and/or the hydrogenated block copolymer obtained by hydrogenating the block copolymer, (b) the nonaromatic-series softening agent for rubber, (c) the ethylene/α-olefin copolymer, (d1) the at least one copolymer of an ethylene/vinyl acetate copolymer, an ethylene/(meth)acrylic acid copolymer, or an ethylene/(meth)acrylate copolymer and/or (d2) the ethylene/propylene copolymer rubber, (e) the polypropylene resin, (f) the modified polyethylene resin being modified with an unsaturated carboxylic acid or a derivative thereof, to obtain the thermoplastic resin component (A), and
a second step of heating and kneading, at a temperature equal to or higher than the melting temperature of the thermoplastic resin component (A), the resultant resin component (A), (g) the organic peroxide, (h) the (meth)acrylate-series and/or allyl-series crosslinking aid, and the metal hydrate (B), to carry out crosslinking.

25. The fire-retardant resin composition as claimed in claim 3, wherein the crosslinking aid (h) is a (meth)acrylate-series crosslinking aid represented by the formula:

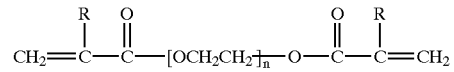

wherein R represents H or CH3, and n is an integer of 1 to 9.

26. The fire-retardant resin composition as claimed in claim 3, wherein the metal hydrate (B) is magnesium hydroxide.

27. The fire-retardant resin composition as claimed in claim 3, wherein the silane coupling agent is a silane compound having a vinyl group and/or an epoxy group at its terminal.

28. A molded article, which has a covering layer of the fire-retardant resin composition as claimed in claim 3, on the outside of a conductor, or an optical fiber element wire and/or an optical fiber core wire.

29. A molded part, which is obtained by molding the fire-retardant resin composition as claimed in claim 3.

30. A method for preparing a fire-retardant resin composition that is the fire retardant resin composition claimed in claim 3, which comprises:
heating and kneading, simultaneously, at a temperature equal to or higher than the melting temperature of the resin ingredients (a) to (f), (a) the block copolymer made up of at least two polymer blocks A mainly made of a vinyl aromatic compound as its constitutional component and at least one polymer block B mainly made of a conjugated diene compound as its constitutional component, and/or the hydrogenated block copolymer obtained by hydrogenating the block copolymer, (b) the nonaromatic-series softening agent for rubber, (c) the ethylene/α-olefin copolymer, (d1) the at least one copolymer of an ethylene/vinyl acetate copolymer, an ethylene/(meth)acrylic acid copolymer, or an ethylene/(meth)acrylate copolymer and/or (d2) the ethylene/propylene copolymer rubber, (e) the polypropylene resin, (f) the modified polyethylene resin being modified with an unsaturated carboxylic acid or a derivative thereof, (g) the organic peroxide, (h) the (meth)acrylate-series and/or allyl-series crosslinking aid, and the metal hydrate (B), to carry out crosslinking.

31. A method for preparing a fire-retardant resin composition that is the fire retardant resin composition claimed in claim 3, which comprises:
a first step of heating and kneading (a) the block copolymer made up of at least two polymer blocks A mainly made of a vinyl aromatic compound as its constitutional component and at least one polymer block B mainly made of a conjugated diene compound as its constitutional component, and/or the hydrogenated block copolymer obtained by hydrogenating the block copolymer, (b) the nonaromatic-series softening agent for rubber, (c) the ethylene/α-olefin copolymer, (d1) the at least one copolymer of an ethylene/vinyl acetate copolymer, an ethylene/(meth)acrylic acid copolymer, or an ethylene/(meth)acrylate copolymer and/or (d2) the ethylene/propylene copolymer rubber, (e) the polypropylene resin, (f) the modified polyethylene resin being modified with an unsaturated carboxylic acid or a derivative thereof, to obtain the thermoplastic resin component (A), and
a second step of heating and kneading, at a temperature equal to or higher than the melting temperature of the thermoplastic resin component (A), the resultant resin component (A), (g) the organic peroxide, (h) the (meth)acrylate-series and/or allyl-series crosslinking aid, and the metal hydrate (B), to carry out crosslinking.

32. The fire-retardant resin composition as claimed in claim 4, wherein the crosslinking aid (h) is a (meth)acrylate-series crosslinking aid represented by the formula:

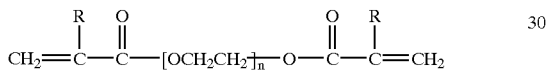

wherein R represents H or $CH_3$, and n is an integer of 1 to 9.

33. The fire-retardant resin composition as claimed in claim 4, wherein the metal hydrate (B) is magnesium hydroxide.

34. The fire-retardant resin composition as claimed in claim 4, wherein the silane coupling agent is a silane compound having a vinyl group and/or an epoxy group at its terminal.

35. The fire-retardant resin composition as claimed in claim 4, wherein the at least one copolymer of an ethylene/vinyl acetate copolymer, an ethylene/(meth)acrylic acid copolymer, or an ethylene/(meth)acrylate copolymer (d1) is an ethylene/vinyl acetate copolymer having a vinyl acetate component content of 25by weight or more.

36. The fire-retardant resin composition as claimed in claim 4, further containing melamine cyanurate in an amount of 3 to 70 parts by weight, to 100 parts by weight of the thermoplastic resin component (A).

37. The fire-retardant resin composition as claimed in claim 4, further containing at least on selected from the group consisting of zinc borate, zinc stannate and zinc hydroxystannate in an amount of 0.5 to 20 parts by weight, to 100 parts by weight of the thermoplastic resin component (A).

38. A molded article, which has a covering layer of the fire-retardant resin composition as claimed in claim 4, on the outside of a conductor, or an optical fiber element wire and/or an optical fiber core wire.

39. A molded part, which is obtained by molding the fire-retardant resin composition as claimed in claim 4.

40. A method for preparing a fire-retardant resin composition that is the fire retardant resin composition claimed in claim 4, which comprises:

heating and kneading, simultaneously, at a temperature equal to or higher than the melting temperature of the resin ingredients (a) to (f), (a) the block copolymer made up of at least two polymer blocks A mainly made of a vinyl aromatic compound as its constitutional component and at least one polymer block B mainly made of a conjugated diene compound as its constitutional component, and/or the hydrogenated block copolymer obtained by hydrogenating the block copolymer, (b) the nonaromatic-series softening agent for rubber, (c) the ethylene/α-olefin copolymer, (d1) the at least one copolymer of an ethylene/vinyl acetate copolymer, an ethylene/(meth)acrylic acid copolymer, or an ethylene/(meth)acrylate copolymer and/or (d2) the ethylene/propylene copolymer rubber, (e) the polypropylene resin, (f) the modified polyethylene resin being modified with an unsaturated carboxylic acid or a derivative thereof, (g) the organic peroxide, (h) the (meth)acrylate-series and/or allyl-series crosslinking aid, and the metal hydrate (B), to carry out crosslinking.

41. A method for preparing a fire-retardant resin composition that is the fire retardant resin composition claimed in claim 4, which comprises:
a first step of heating and kneading (a) the block copolymer made up of at least two polymer blocks A mainly made of a vinyl aromatic compound as its constitutional component and at least one polymer block B mainly made of a conjugated diene compound as its constitutional component, and/or the hydrogenated block copolymer obtained by hydrogenating the block copolymer, (b) the nonaromatic-series softening agent for rubber, (c) the ethylene/α-olefin copolymer, (d1) the at least one copolymer of an ethylene/vinyl acetate copolymer, an ethylene/(meth)acrylic acid copolymer, or an ethylene/(meth)acrylate copolymer and/or (d2) the ethylene/propylene copolymer rubber, (e) the polypropylene resin, (f) the modified polyethylene resin being modified with an unsaturated carboxylic acid or a derivative thereof, to obtain the thermoplastic resin component (A), and
a second step of heating and kneading, at a temperature equal to or higher than the melting temperature of the thermoplastic resin component (A), the resultant resin component (A), (g) the organic peroxide, (h) the (meth)acrylate-series and/or allyl-series crosslinking aid, and the metal hydrate (B), to carry out crosslinking.

42. The fire-retardant resin composition as claimed in claim 1, wherein the silane coupling agent is a crosslinking silane coupling agent.

43. The fire-retardant resin composition as claimed in claim 2, wherein the silane coupling agent is a crosslinking silane coupling agent.

44. The fire-retardant resin composition as claimed in claim 3, wherein the silane coupling agent is a crosslinking silane coupling agent.

45. The fire-retardant resin composition as claimed in claim 4, wherein the silane coupling agent is a crosslinking silane coupling agent.

* * * * *